United States Patent [19]

Maskas

[11] Patent Number: 5,428,764
[45] Date of Patent: Jun. 27, 1995

[54] SYSTEM FOR RADIAL CLOCK DISTRIBUTION AND SKEW REGULATION FOR SYNCHRONOUS CLOCKING OF COMPONENTS OF A COMPUTING SYSTEM

[75] Inventor: Barry A. Maskas, Sterling, Mass.

[73] Assignee: Digital Equipment Corporation, Maynard, Mass.

[21] Appl. No.: 873,923

[22] Filed: Apr. 24, 1992

[51] Int. Cl.[6] .................. H03K 5/135; H03K 5/14
[52] U.S. Cl. ........................... 395/550; 371/1; 307/409; 375/356; 327/258; 327/292
[58] Field of Search .............. 398/550; 307/269, 602; 370/107; 371/1

[56] References Cited

U.S. PATENT DOCUMENTS

| | | |
|---|---|---|
| 4,475,085 | 10/1984 | Yahata et al. . |
| 4,675,612 | 6/1987 | Adams et al. . |
| 4,755,704 | 7/1988 | Flora et al. . |
| 4,926,066 | 5/1990 | Maini et al. . |
| 5,087,829 | 2/1992 | Ishibashi et al. . |
| 5,204,559 | 4/1993 | Deyhimy et al. . |
| 5,272,390 | 12/1993 | Watson, Jr. et al. . |
| 5,307,381 | 4/1994 | Ahuja ................................ 375/107 |
| 5,309,035 | 5/1994 | Watson, Jr. et al. ............. 307/269 |
| 5,369,640 | 11/1994 | Watson et al. ..................... 371/1 |

*Primary Examiner*—Parshotam S. Lall
*Assistant Examiner*—Brian Ledell
*Attorney, Agent, or Firm*—Arthur W. Fisher; Denis G. Maloney; Lindsay G. McGuinness

[57] ABSTRACT

A radial clock distribution system that converts a standard bus clock signal into two pairs of inverted and non-inverted clocking signals. The two pairs of clocking signals have a lower frequency, have a different phase, and are shifted one clock period apart. The clocking signals are transferred over a first set of signal lines of equal length and impedance to computing systems components that are connected to a synchronous bus. Each component includes at least one clock repeater chip to convert the clocking signals (e.g., change these signals to a 5 volt CMOS level) to a different format. The converted clocking signals are then transferred over a second set of signal lines of equal length and impedance to the gate arrays. The gate arrays includes direct drive circuitry that receives the converted clocking signals and transmits these signals to internal driver circuitry. These signals are transferred over low skew lines. The output of the interval driver circuitry is input to local buffer circuitry that distributes the converted clocking signals to elements of a component for use as clocking signals.

9 Claims, 29 Drawing Sheets

| FIG.1A | FIG.1B | FIG.1C | FIG.1D |
| --- | --- | --- | --- |
| FIG.1E | FIG.1F | FIG.1G | FIG.1H |

*ALL CLOCK SIGNALS BEFORE AND AFTER THE E111'S MUST BE ROUTED SUCH THAT THEY ALL SEE THE SAME LENGTH ETCH AND ELECTRICAL CHARACTERISTICS*

SYSTEM FOR RADIAL CLOCK DISTRIBUTION AND SKEW REGULATION FOR SYNCHRONOUS CLOCKING OF COMPONENTS OF A COMPUTING SYSTEM

FIELD OF THE INVENTION

The present invention relates to systems for reducing skewing errors in a synchronously clocked computing system.

BACKGROUND OF THE INVENTION

In many computer applications, synchronously operating computing system components communicate with each other over a synchronous bus. Signals transmitted between these components include both command and data information.

When a synchronous bus is used to couple a number of synchronously operating computing system components, clocking signals are distributed to each component over the bus. These clocking signals may be generated at a central location and then provided to each component connected to the bus. This type of radially distributed clock scheme is common in computer systems.

Generally, the clocking signals are generated at a central source, such as a bus clock module or utility module. The signals that are generated by the source are usually digital, positive emitter coupled logic (PECL), or emitter coupled logic (ECL) signals.

Each component that is connected to the synchronous bus buffers the clocking signal with a repeater or level converter or other device that carries out the equivalent processing function. Due to the different distances that the clocking signals travel to reach the repeater or level converter at the components, the clocking signals are skewed. Normally, the repeater uses phase locked loop (PLL) or digital locked loop (DLL) techniques to minimize skewing that occurs. When the system can tolerate a greater amount of clock skew, a simple one-to-eight fanout buffer chip may be used. Besides the distance problem, temperature, semiconductor and module processing, voltage levels, load, and other variations are factors which also may affect clocking skew.

There is a need for a clock distribution scheme which reduces clocking skew in components of a computing system connected to a synchronous bus without the need to use digital or phase lock loop devices to avoid jitter and locking problems.

SUMMARY OF THE INVENTION

The present invention is a system for radially distributing clocking signals to a plurality of computing system components connected to a synchronous bus. The present invention provides a system that minimizes skew errors by the design of the distribution elements and the use of a PVTL (Process, Voltage, Temperature, and Loading) compensation clock repeater chips. Given the tight skew control, multiple single phase clock signals are distributed to each computing system component.

More specifically, the apparatus of the present invention has a radial clock driver that converts a bus clock signal into first and second pairs of non-inverted and inverted clocking signals. The clock period of the two pairs of clocking signals is greater (e.g., four times greater) than the clock period of the bus clock signal. The two pairs of clocking signals are phase shifted and the second pair of clocking signals is delayed by one bus clock period behind the first pair of clocking signals.

The two pairs of clocking signals are derived using three D-type flip-flops. The bus clock signal is input to the clock input of the three D-type flip-flops. The inverting output of the first flip-flop is coupled to the data input of the second flip-flop. The non-inverting output of the second flip-flop is coupled to the data input of the first flip-flop and the inverting output of the second flip-flop is coupled to the data input of the third flip-flop. The inverting and non-inverting outputs of the second and third flip-flops are the first and second pairs of clock signals, respectively. The first and second pairs of clocking signals from the second and third flip-flops are coupled to separate low skew differential clock drivers and distributed along a first set of signal lines of equal length and impedance that connect to the computing system components coupled to the synchronous bus.

Each of the computing system components has one or two clock repeater chips which provide PVTL compensation to the two pairs of differential clocking signals. These repeater chips change the differential clocking signals to 5 volt CMOS level signals. The converted signals are then transmitted along a second set of signal lines of equal length and impedance to gate arrays which also are part of each computing system component. Therefore, there are two differential clock pairs that are used to derive four single phase clock signals, which divide a synchronous clock period into four equal length sub-intervals.

Each gate array includes direct drive circuitry which receives the conventional clocking signals. The output of the direct driver circuitry via low skew configured lines is input to internal driver circuitry. The output of the internal driver circuitry via low skew configured lines is input to local buffers which distribute the clocking signals to component elements.

In a second embodiment of the present invention, each computing system component may combine the differential clocking signals from several local buffers and then use these signals to operate at a frequency between that of the clocking signals and that of the synchronous bus clock signal.

The use of balanced signal lines and comparable receiving and buffering circuitry in each of the computing system components greatly minimizes skew, jitter, and lock errors compared to standard phase locked loop (PLL) and digital locked loop (DLL) techniques.

DETAILED DESCRIPTION OF THE INVENTION

Figures 1, 1G:
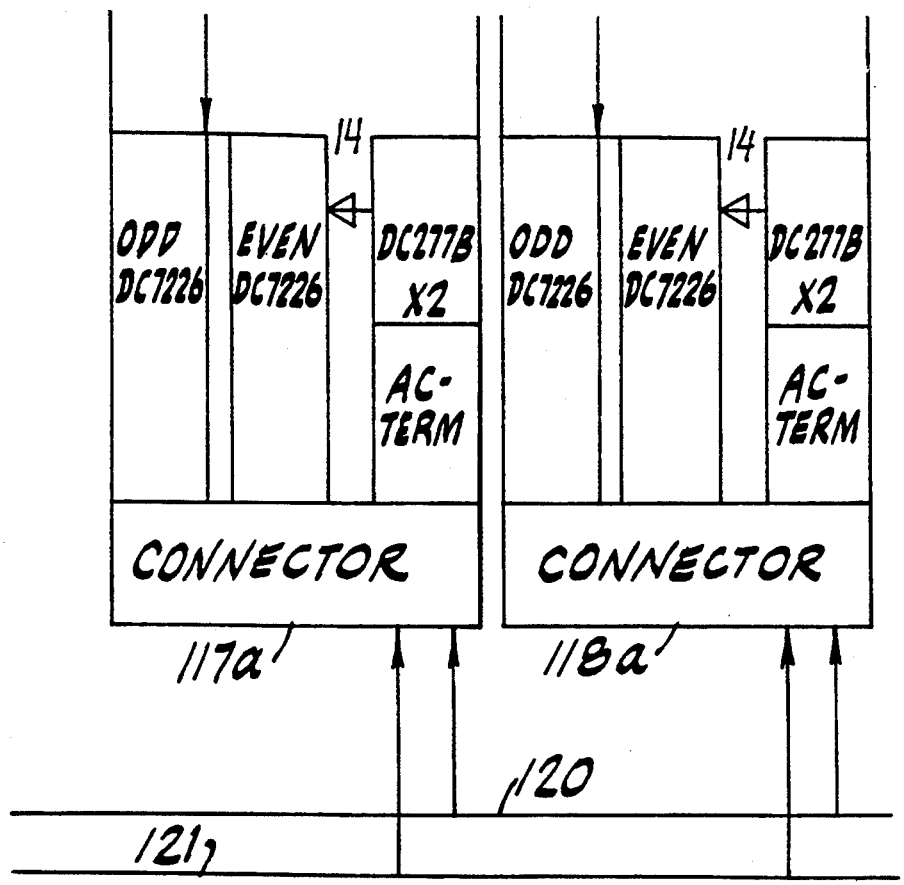
FIG. 1 is a key to reconstruction of FIGS. 1A–1H which is a block diagram of a computing system that includes the system of the present invention.
Figure 1A:
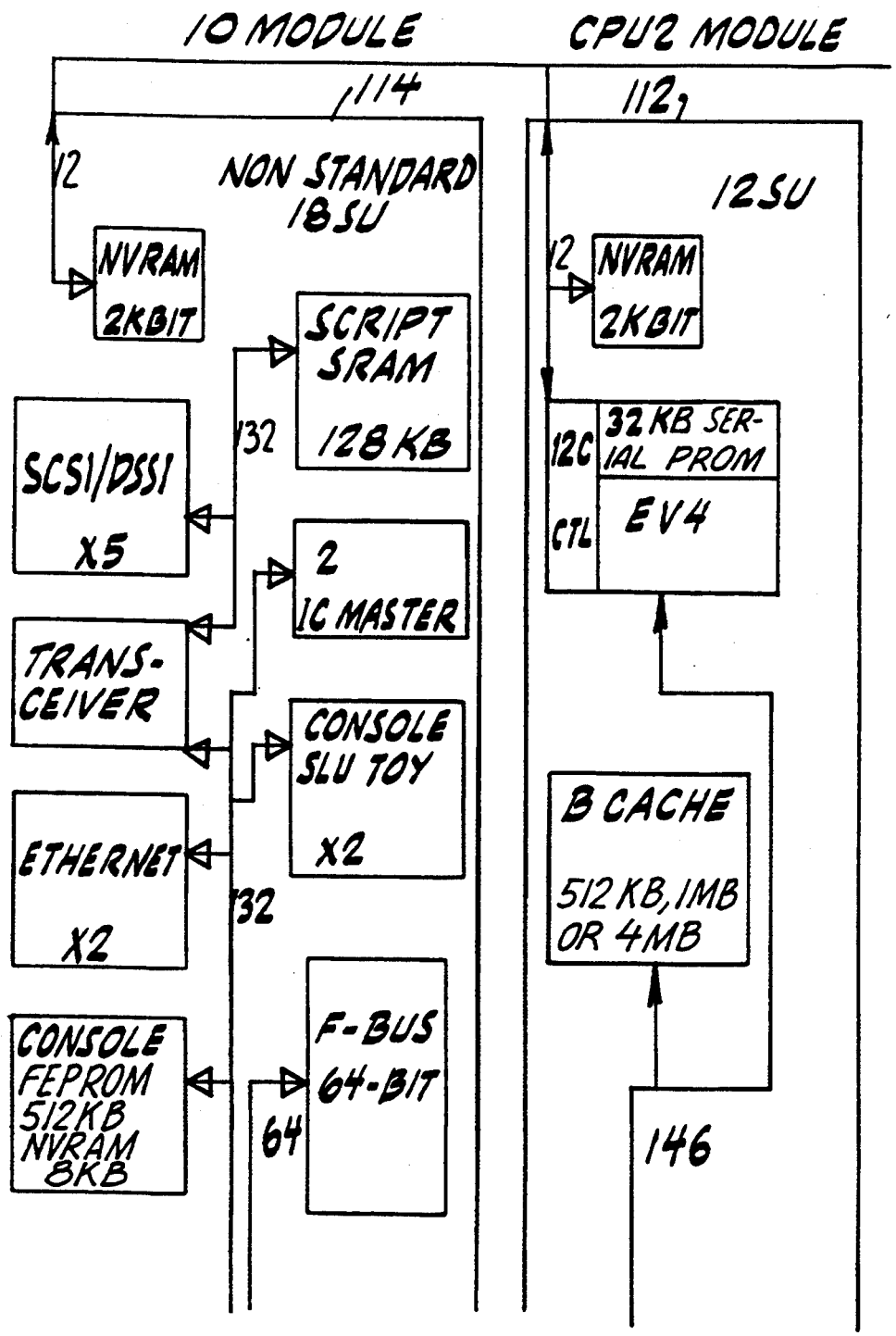
Figure 1B:
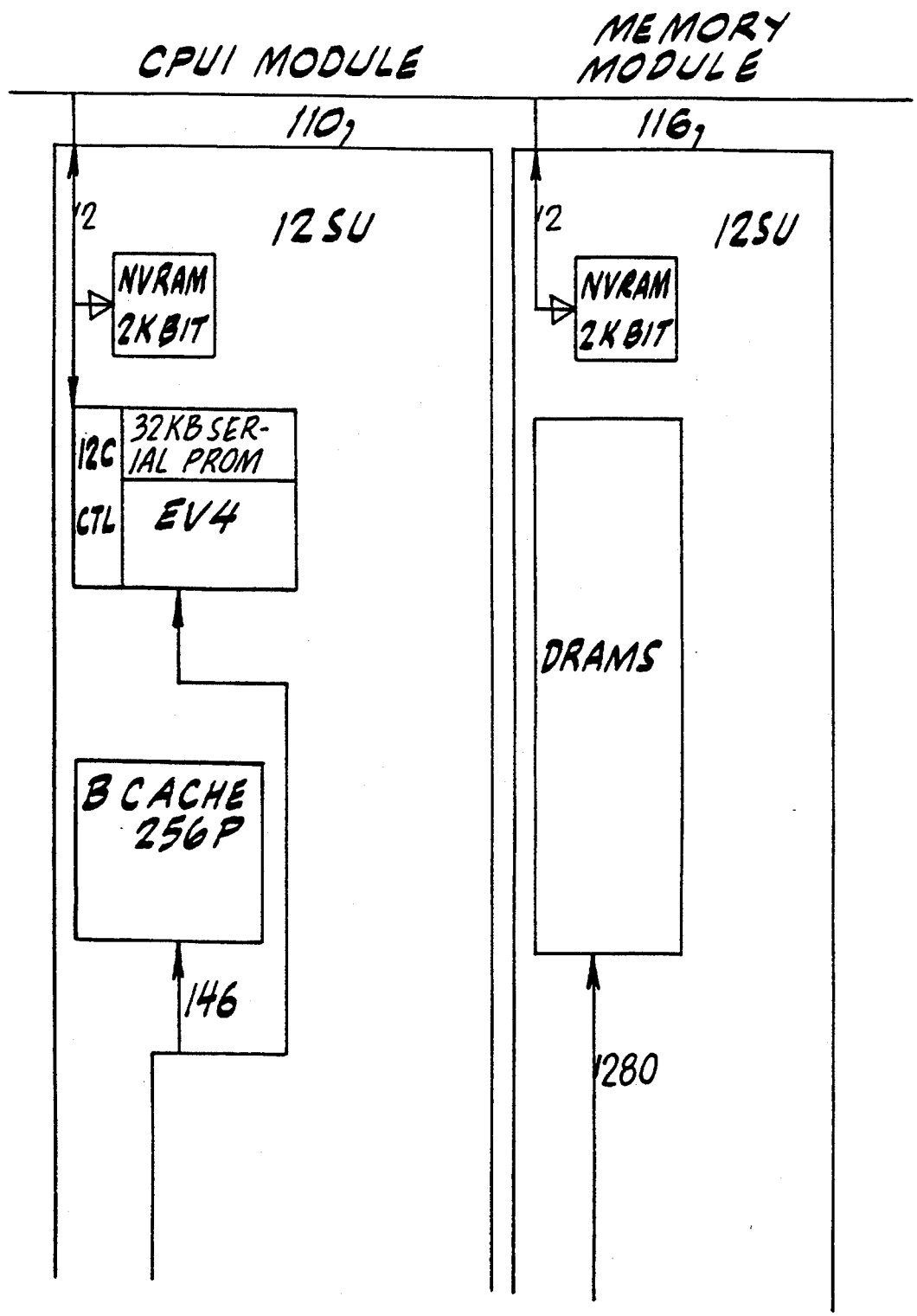
Figure 1C:
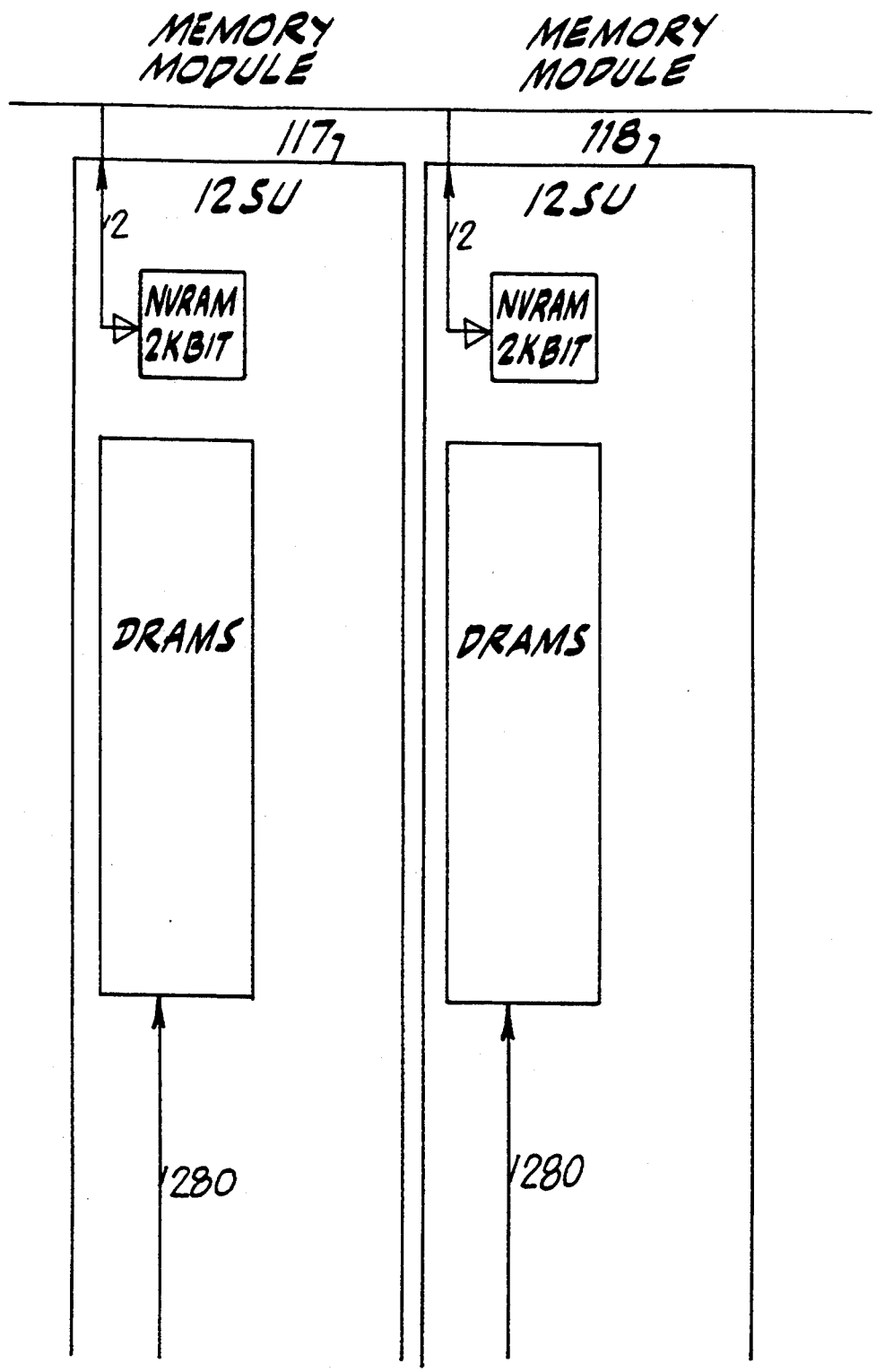
Figure 1D:
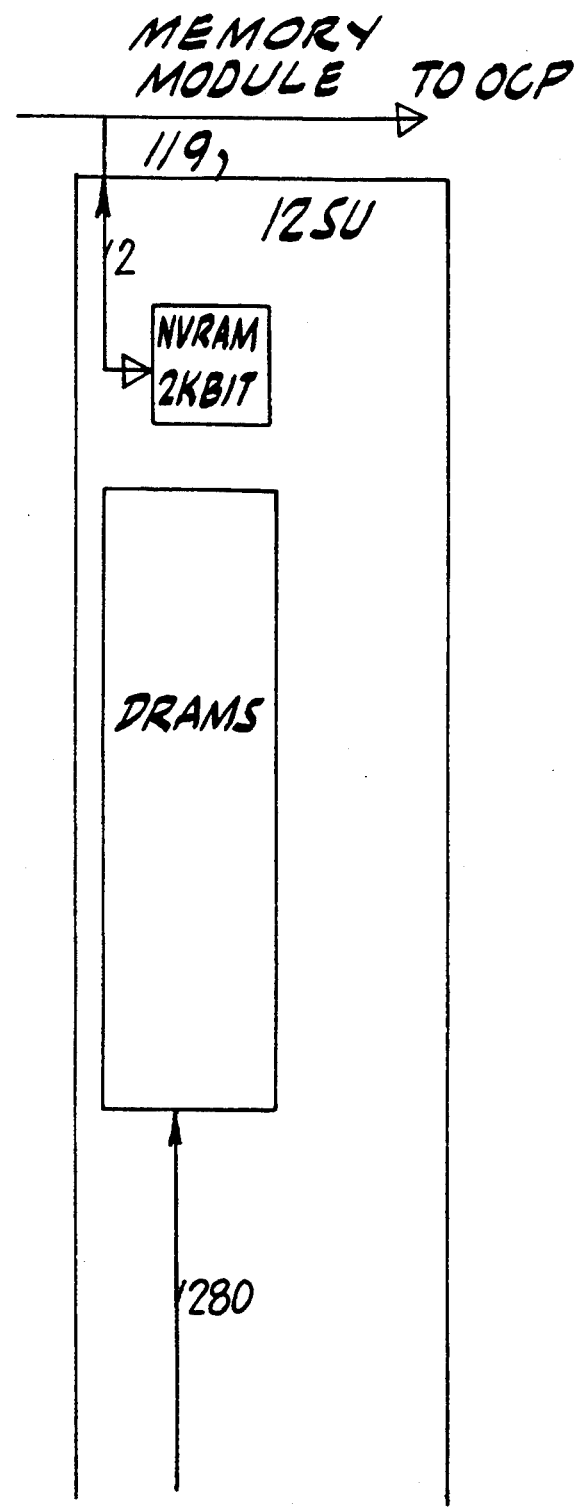
Figure 1E:
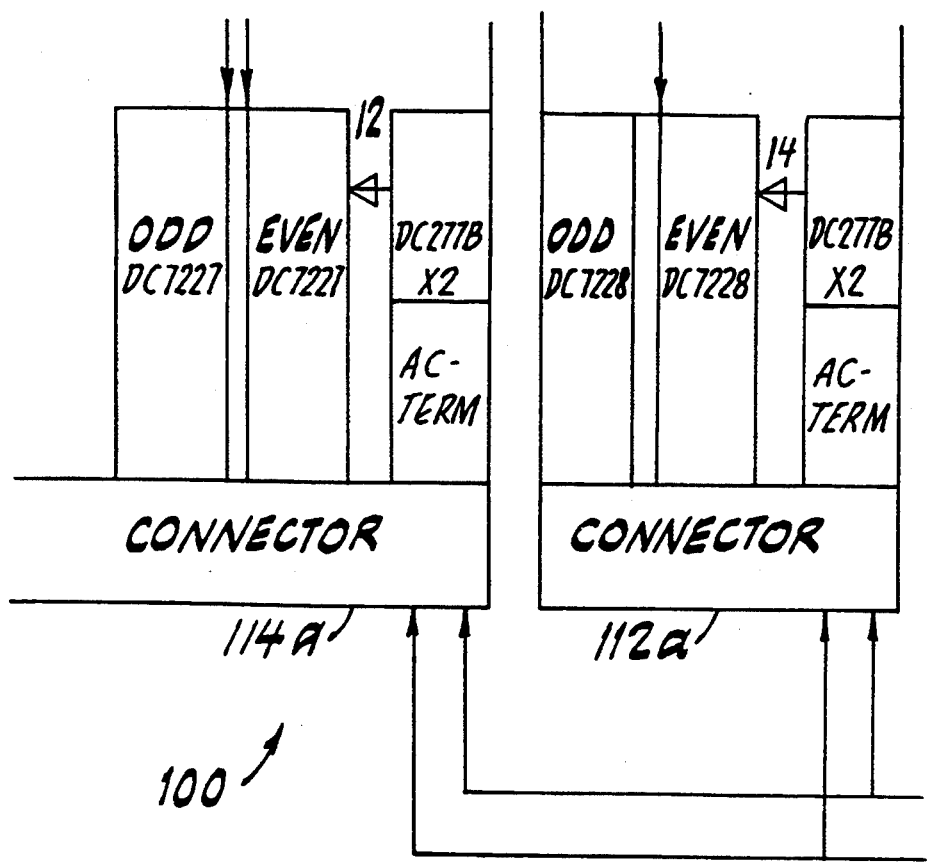
Figure 1F:
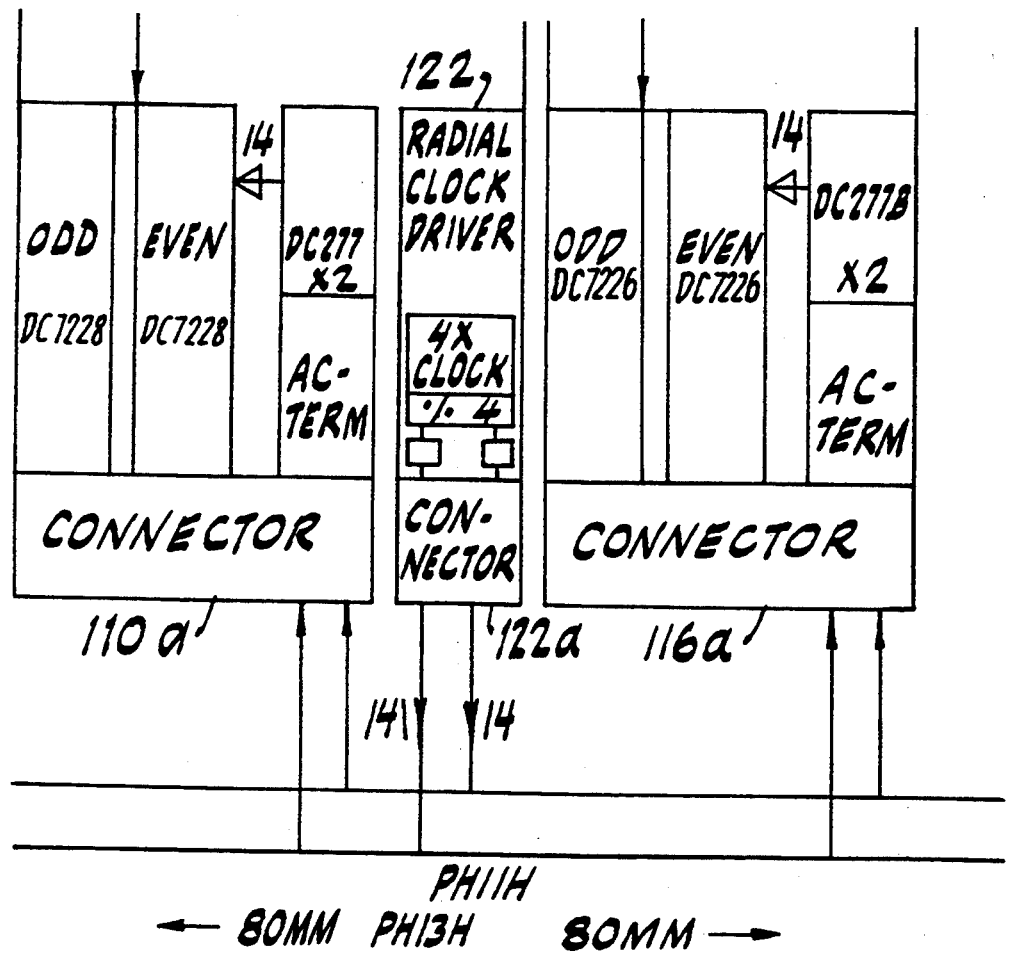
Figure 1H:
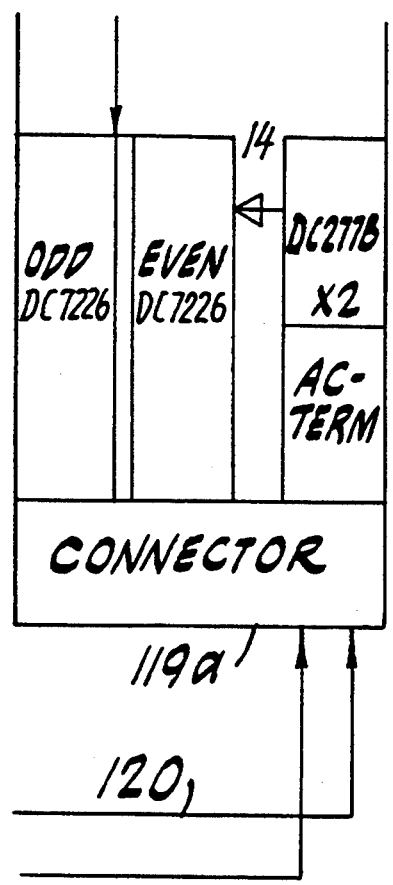
Figure 2F:
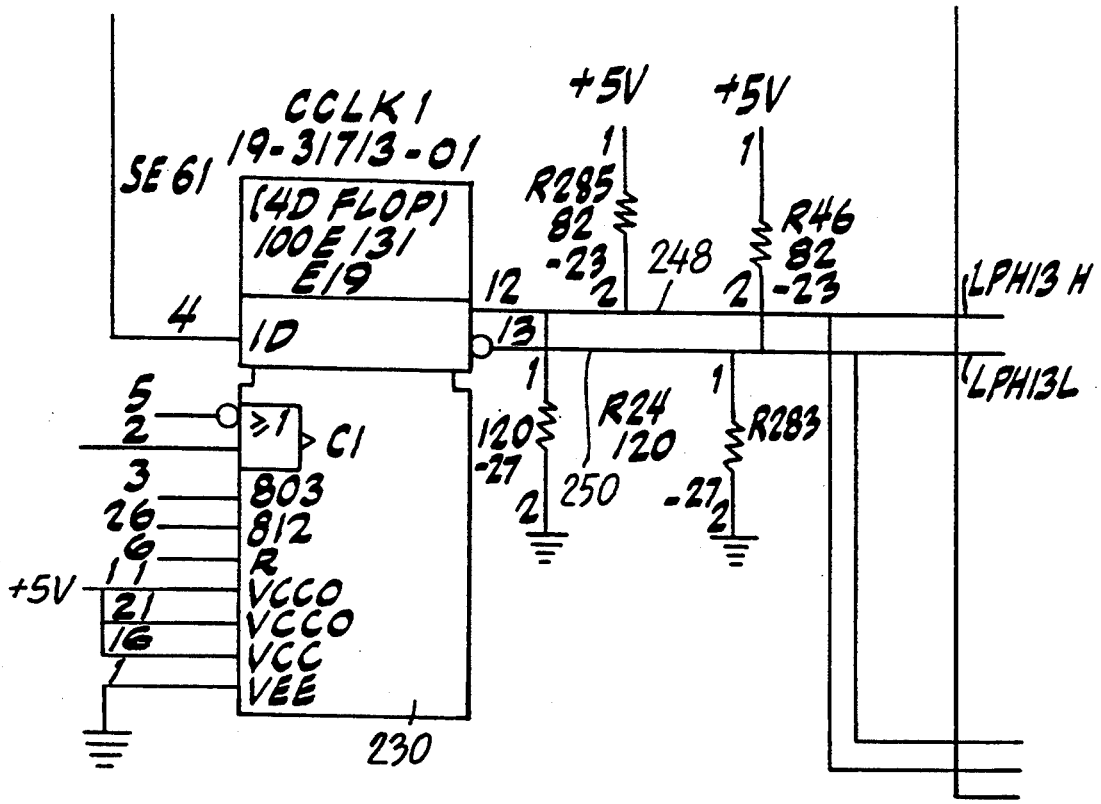
FIG. 2 is a key to reconstruction of FIGS. 2A–2H which is a circuit diagram of the radial clock driver of the present invention.
Figure 2A:
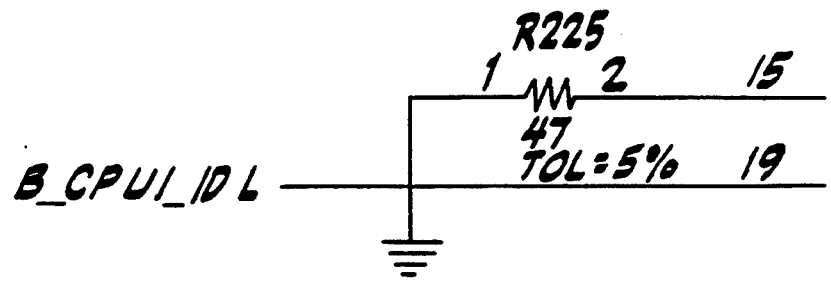
Figure 2A:
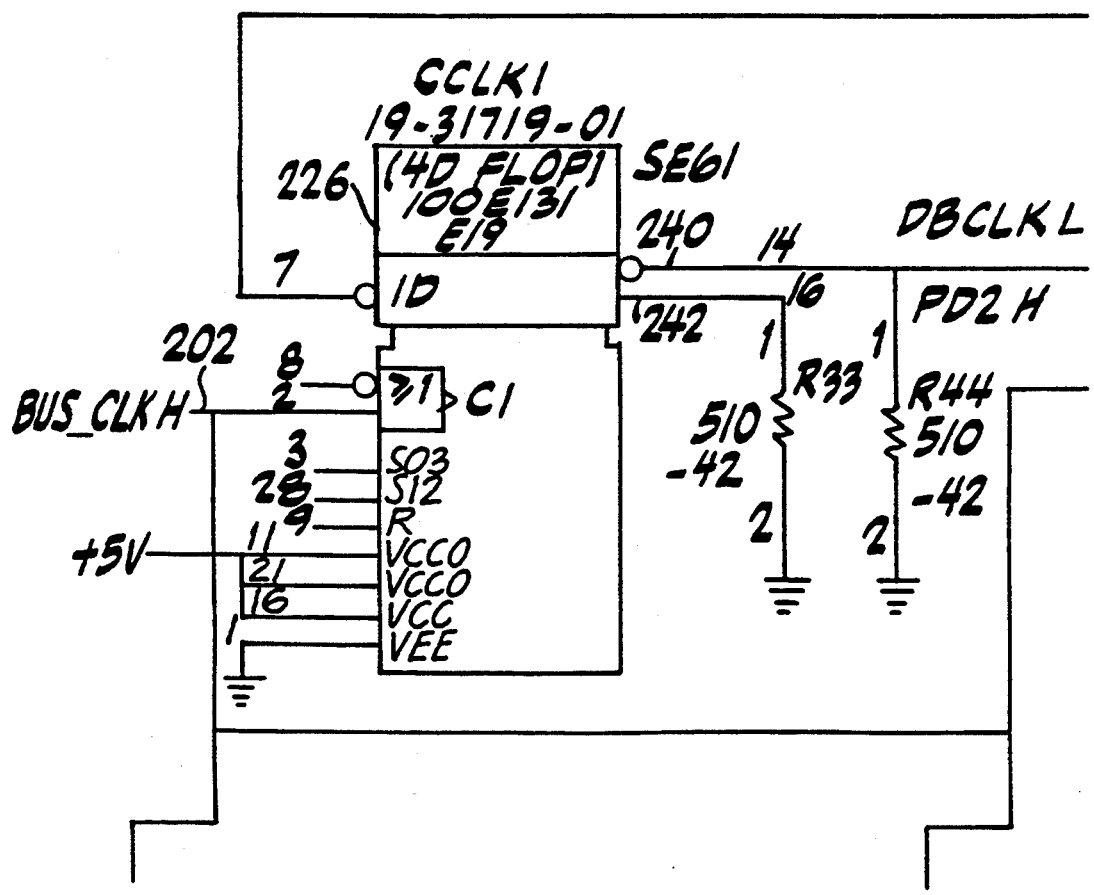
Figure 2B:
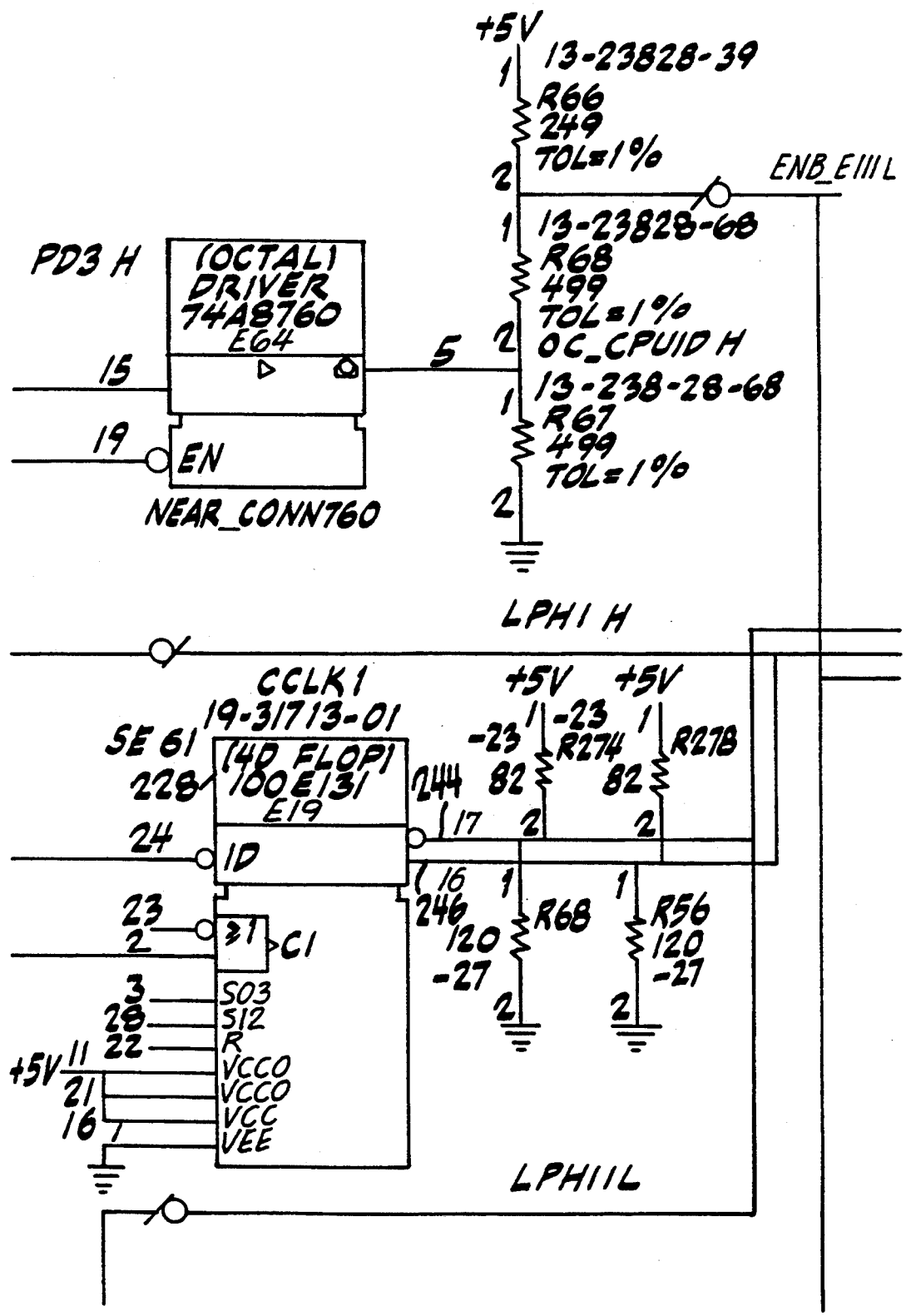
Figure 2C:
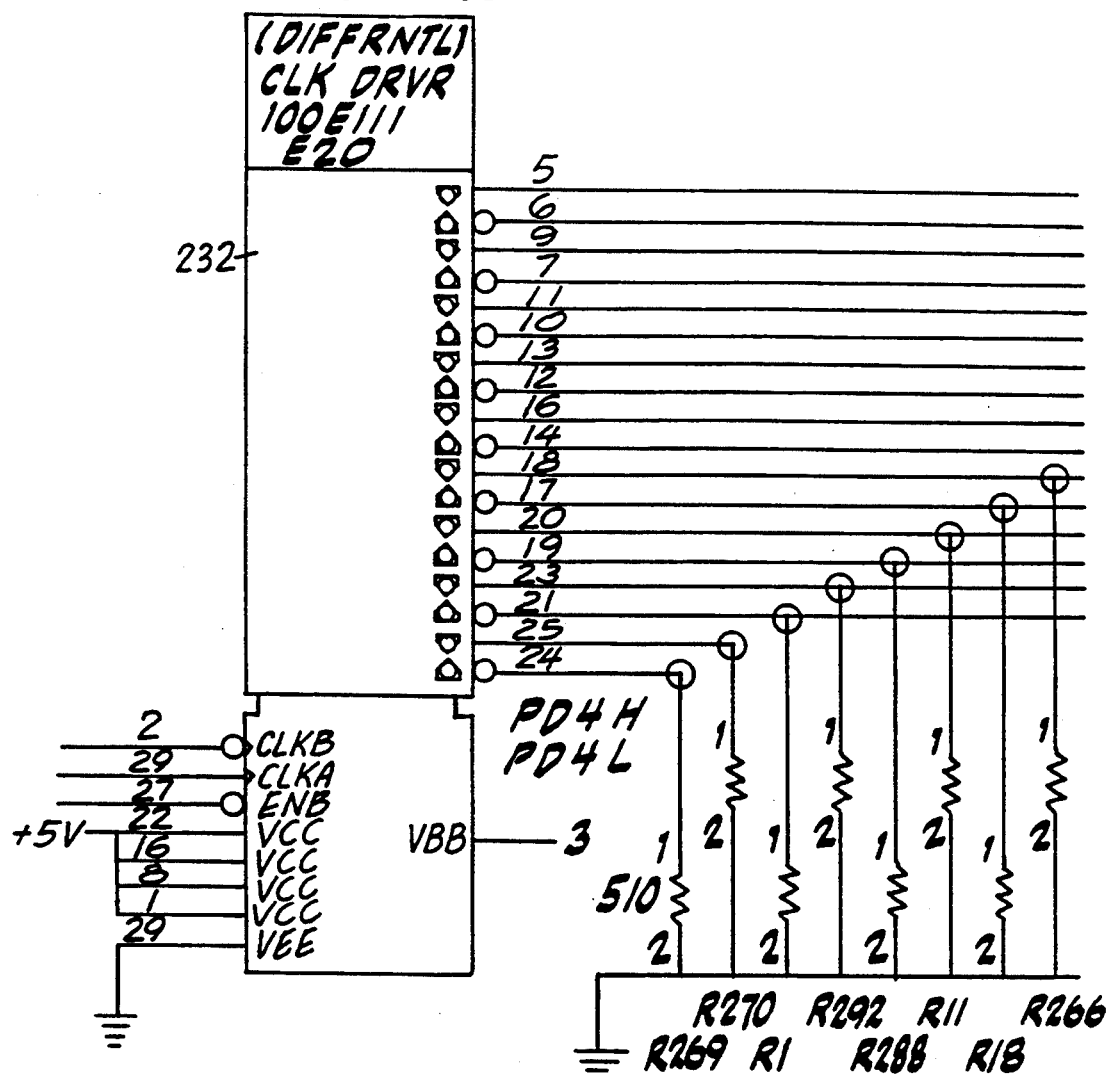
Figure 2D:
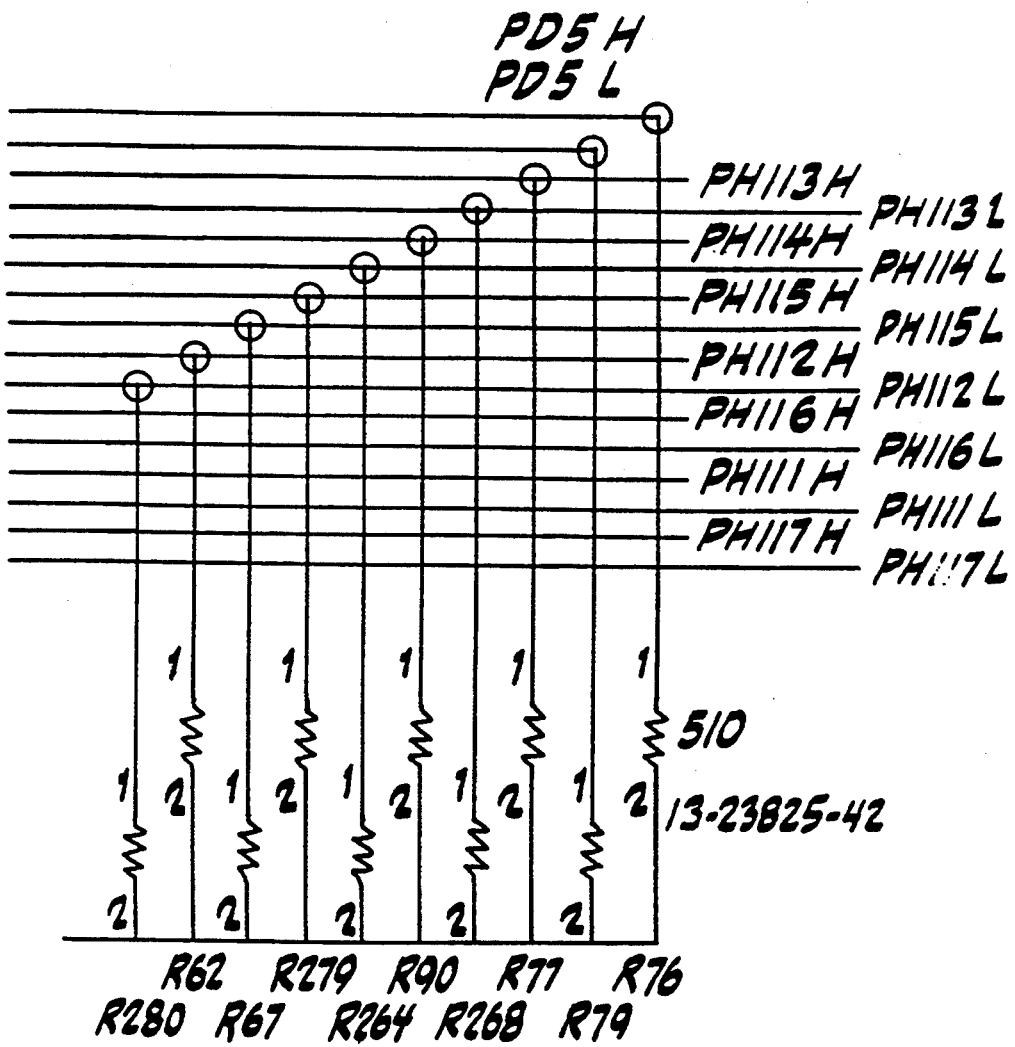
Figure 2E:
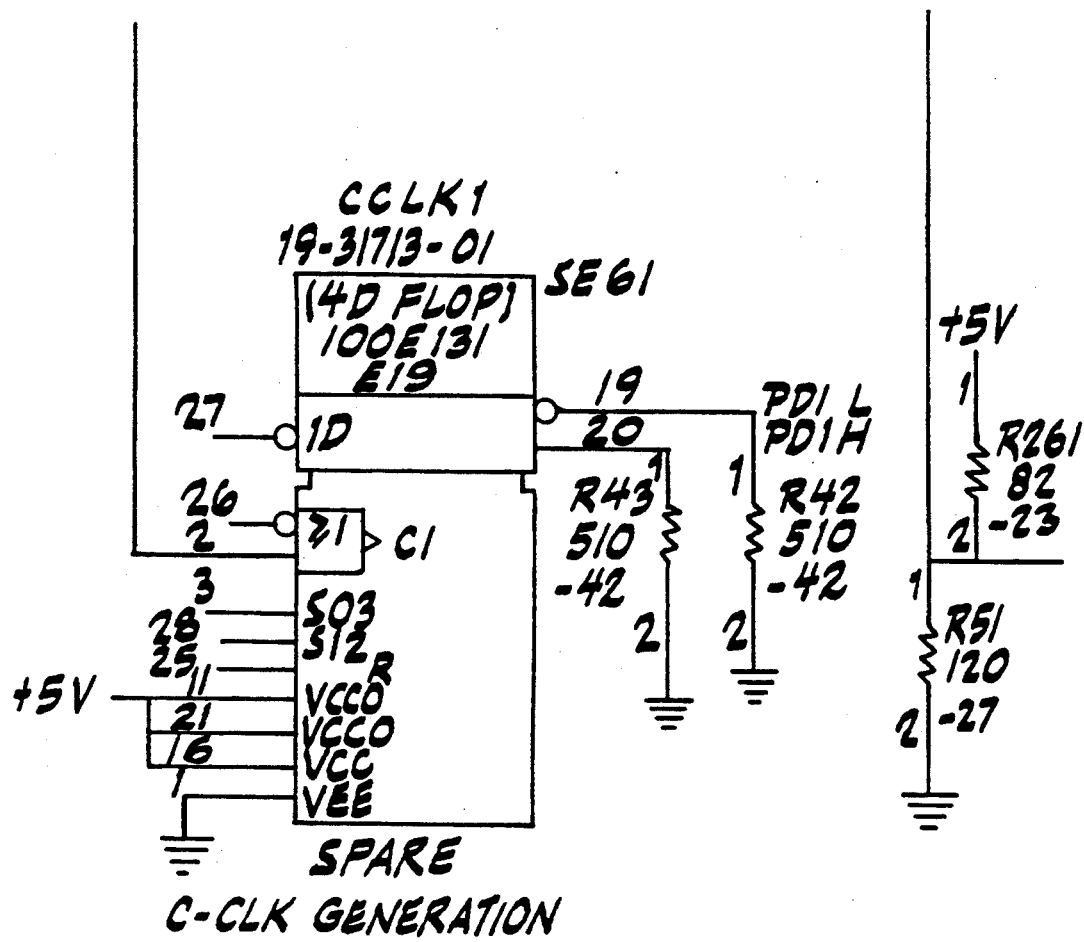
Figure 2G:
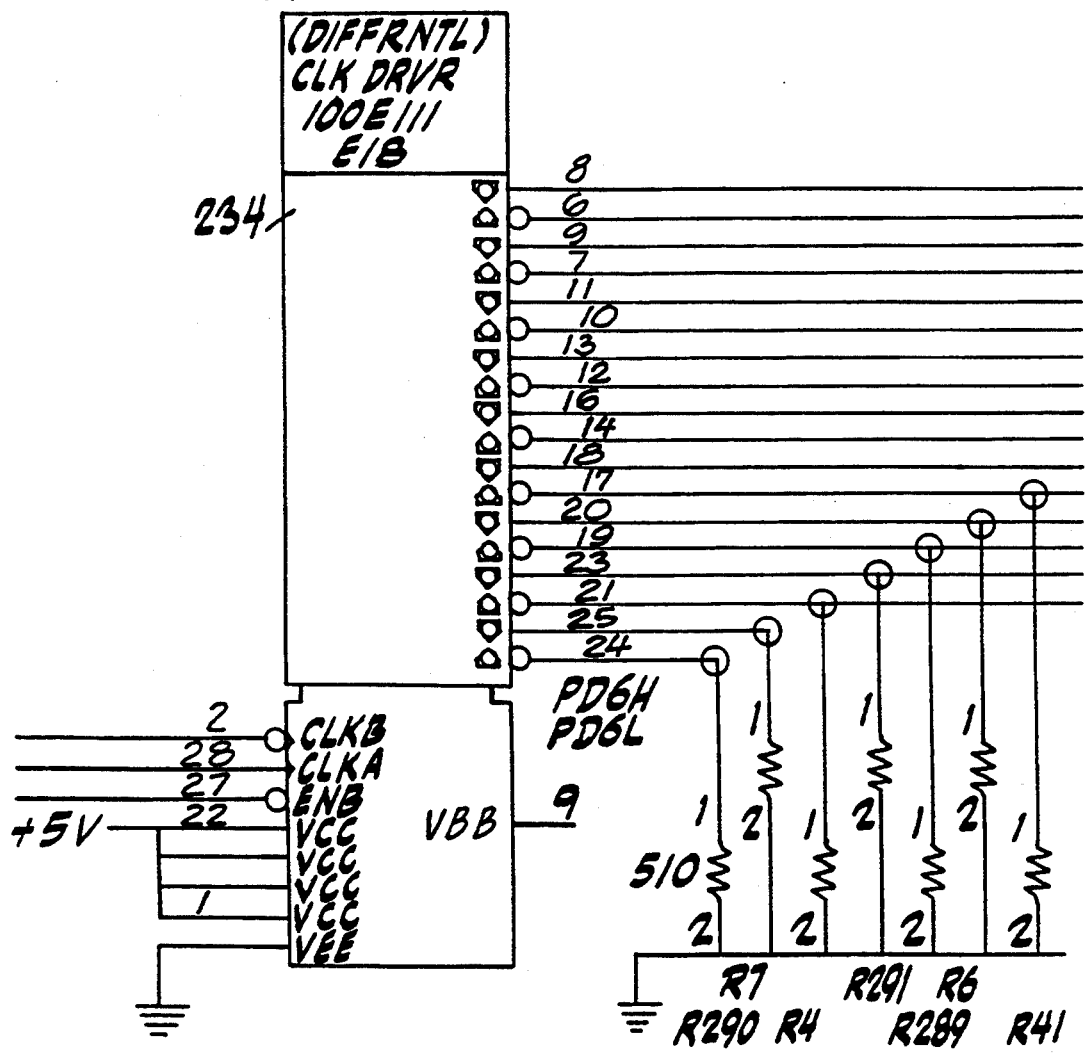
Figure 2H:
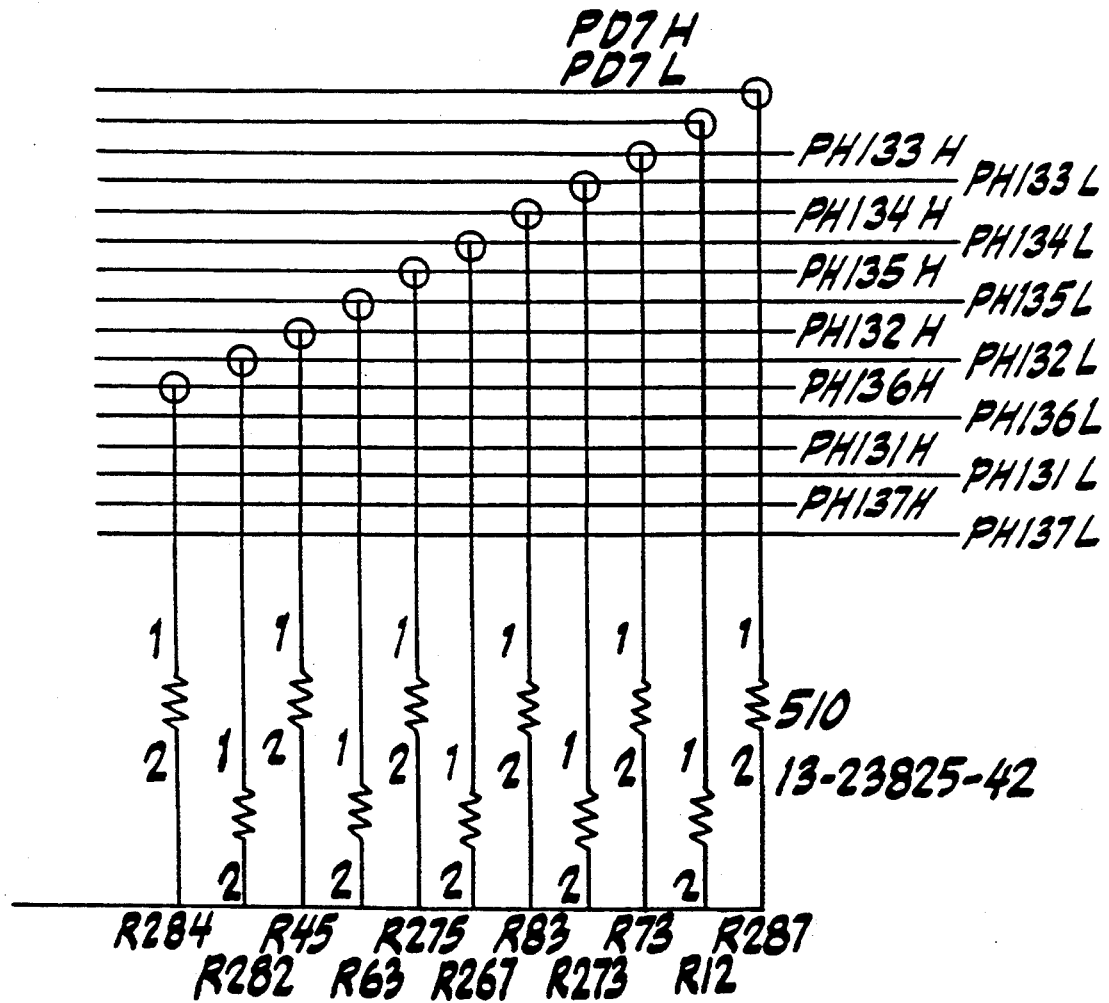

Referring to FIG. 1, a representative computing system that includes the system of the present invention is shown generally at 100. The system includes central processing unit (CPU) modules 110 and 112, input/output (IO) module 114, and memory modules 116, 117, 118, and 119. The computing system components are coupled by a synchronous bus. The signal lines for providing the differential clocking signals generated by the system of the present invention are shown at 120 and 121.

CPU module 110 includes radial clock driver 122, which generates positive emitter controlled logic (PECL) clocking signals for clocking the computing system components coupled to the synchronous bus. Signal lines 120 and 121 carry the differential clocking signals from backplane connector 122a of radial clock driver 122 to backplane connectors 110a, 112a, 114a, 116a, 117a, 118a, and 119a of CPU module 110, CPU module 112, IO module 114, and memory modules 116, 117, 118, and 119, respectively.

Referring to FIG. 2, a circuit diagram of radial clock driver 122 is shown. Synchronous bus clock signal 202, which is shown as BUS CLK in FIG. 2, is input to the clock inputs of D-type flip-flops 226, 228, and 230. The inverting output of flip-flop 226 on line 240 is input to the data input of flip-flop 228. The non-inverting output of flip-flop 226 on line 242 is grounded. The inverting output flip-flop 228 on line 244 is input to the data input of flip-flop 226. The non-inverting output of flip-flop 228 on line 246 is input to the data input of flip-flop 230.

The inverting output on line 244 and the non-inverting output on line 246 of flip-flop 228 form the first differential pair of clocking signals. The non-inverting output on line 248 and the inverting output on line 250 of flip-flop 230 form the second differential pair of clocking signals.

The circuit formed by flip-flops 226, 228, and 230 is a frequency divider circuit which reduces the frequency of BUS_CLK signal 202 preferably, by a factor of four. Accordingly, the first and second differential pairs of clocking signals from flip-flops 228 and 230, respectively, have a frequency that is one-fourth the frequency of BUS_CLK signal 202.

The inverted output on line 244 and non-inverted output on line 246 of flip-flop 228 are input to the clock inputs first differential clock driver 232. The non-inverted output on line 248 and inverted output on line 250 of flip-flop 230 are input to the clock inputs of second differential clock driver 234. Differential clock driver 232 generates differential clock signals for line 120 (FIG. 1) and differential clock driver 234 generates differential clock signals for line 121 (FIG. 1). Each of these lines are 14 bits wide. Differential clock drivers 232 and 234 are enabled by CPU module 110.

Figure 3:
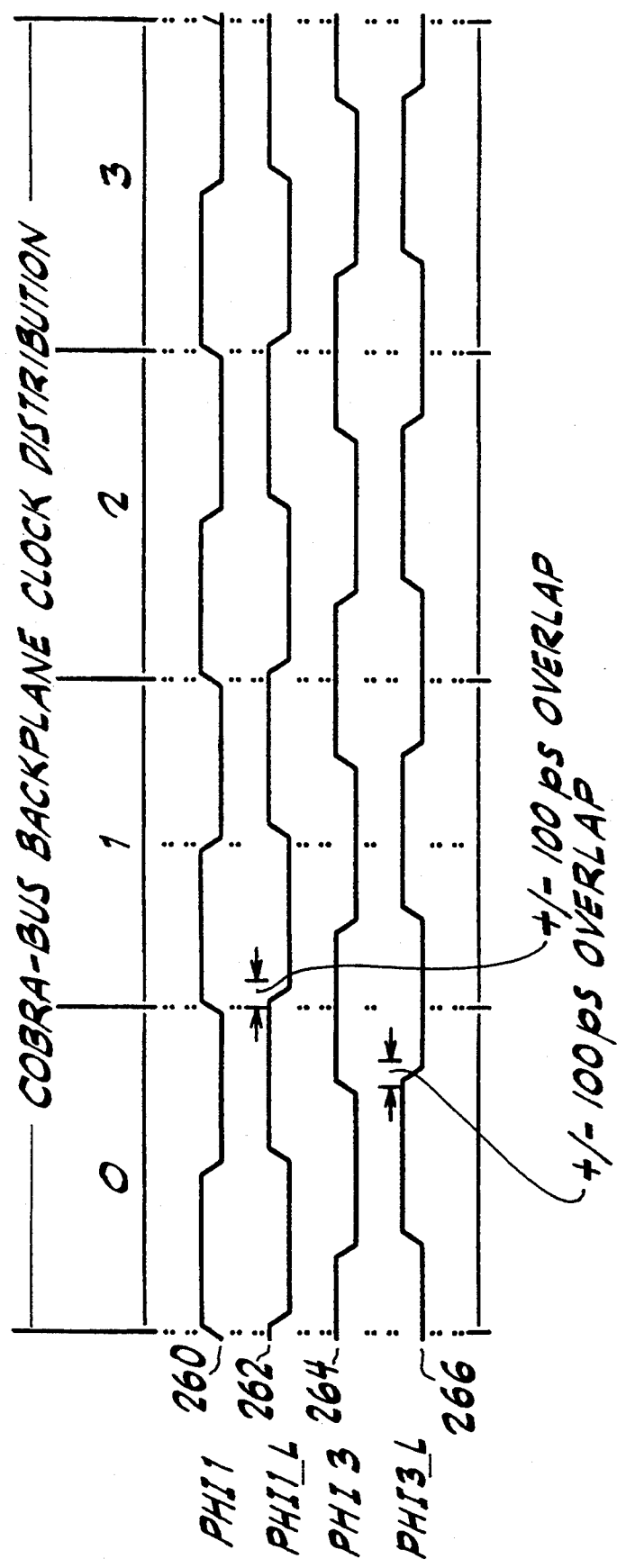
FIG. 3 is a timing diagram of the clocking signals generated by the radial clock driver circuit of FIG. 2.

FIG. 3 is a timing diagram for the two pairs differential clocking signals output from differential clock drivers 232 and 234. The differential clocking signals output from flip-flop 228 are the PHI1 signal at 260 and the PHI1_L signal at 262. The clocking signals output from flip-flop 230 are the PHI3 signals at 264 and the PHI-3_L at 266. Signals at 264 and 266 are phase shifted and delayed one BUS_CLK signal period with respect signals 260 and 262.

Figure 4:
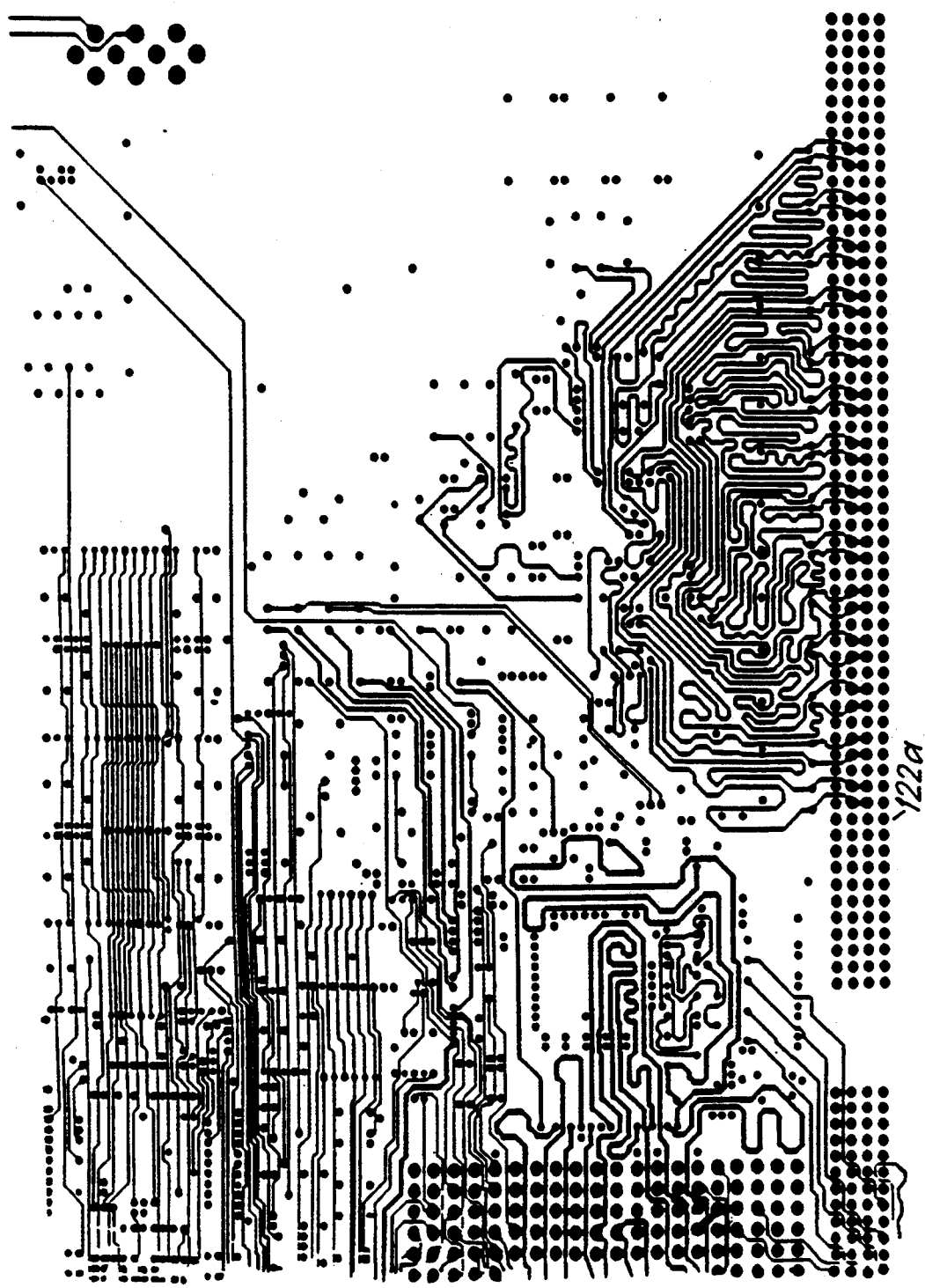
FIG. 4 is an etch diagram showing the metalization connection between the radial clock driver of FIG. 2 and its backplane connector.

To assist in preventing skewing of the differential clocking signals, all metalization connections between the differential clock drivers 232 and 234 and radial clock driver backplane connector 122a are of equal length and impedance. These metalization connections between differential clock drivers 232 and 234 and radial clock driver backplane connector 122a are shown in FIG. 4. In this Figure, the 28 signal lines that emanate from differential clock drivers 232 and 234 are shown connecting to radial clock driver backplane connector 122a. The backplane connections are over equal length pins.

Figure 5:
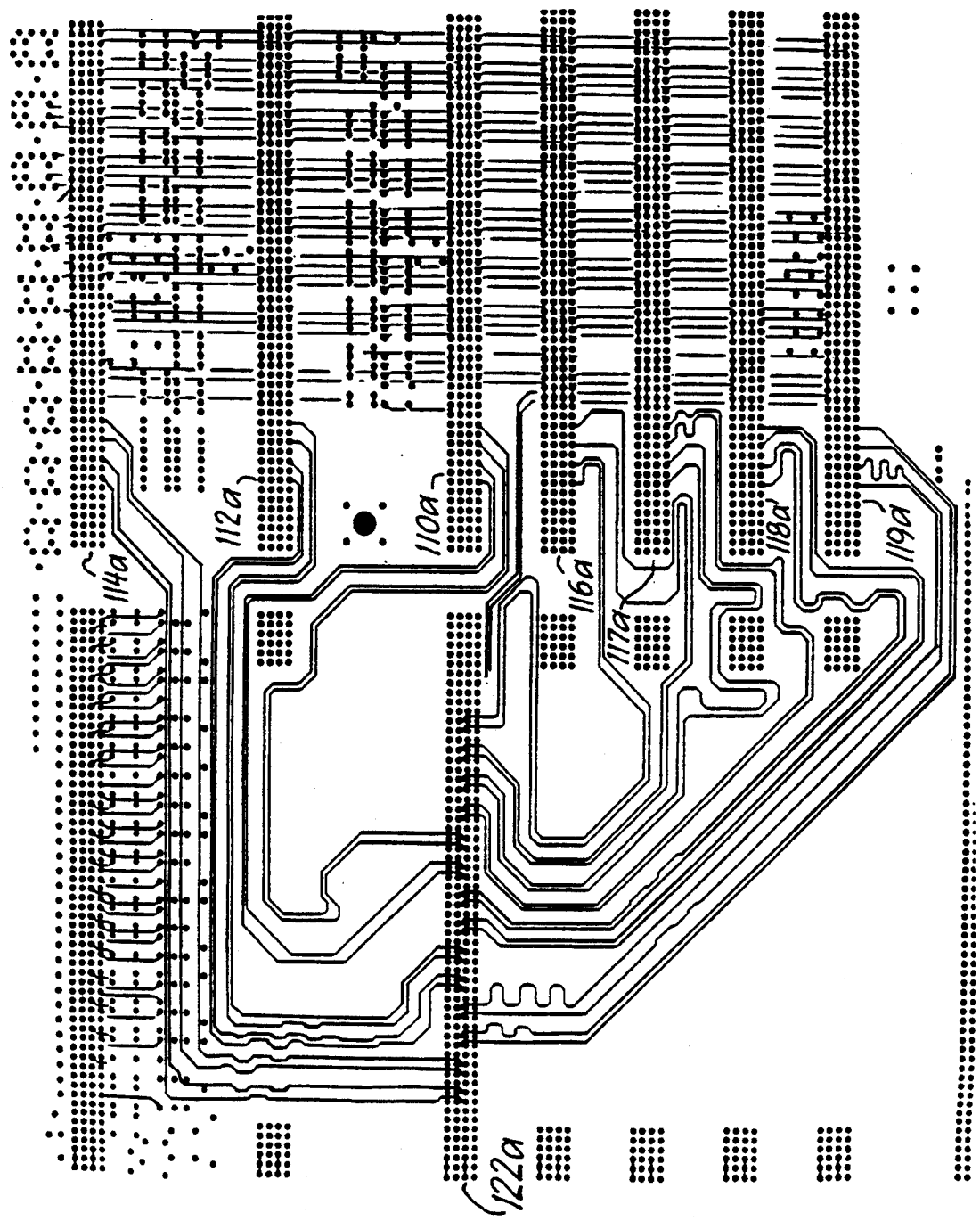
FIG. 5 is an etch diagram showing the metalization connection between the radial clock driver backplane connector of FIG. 4 and backplane connectors of computing system components shown in FIG. 1.
Figure 6G:
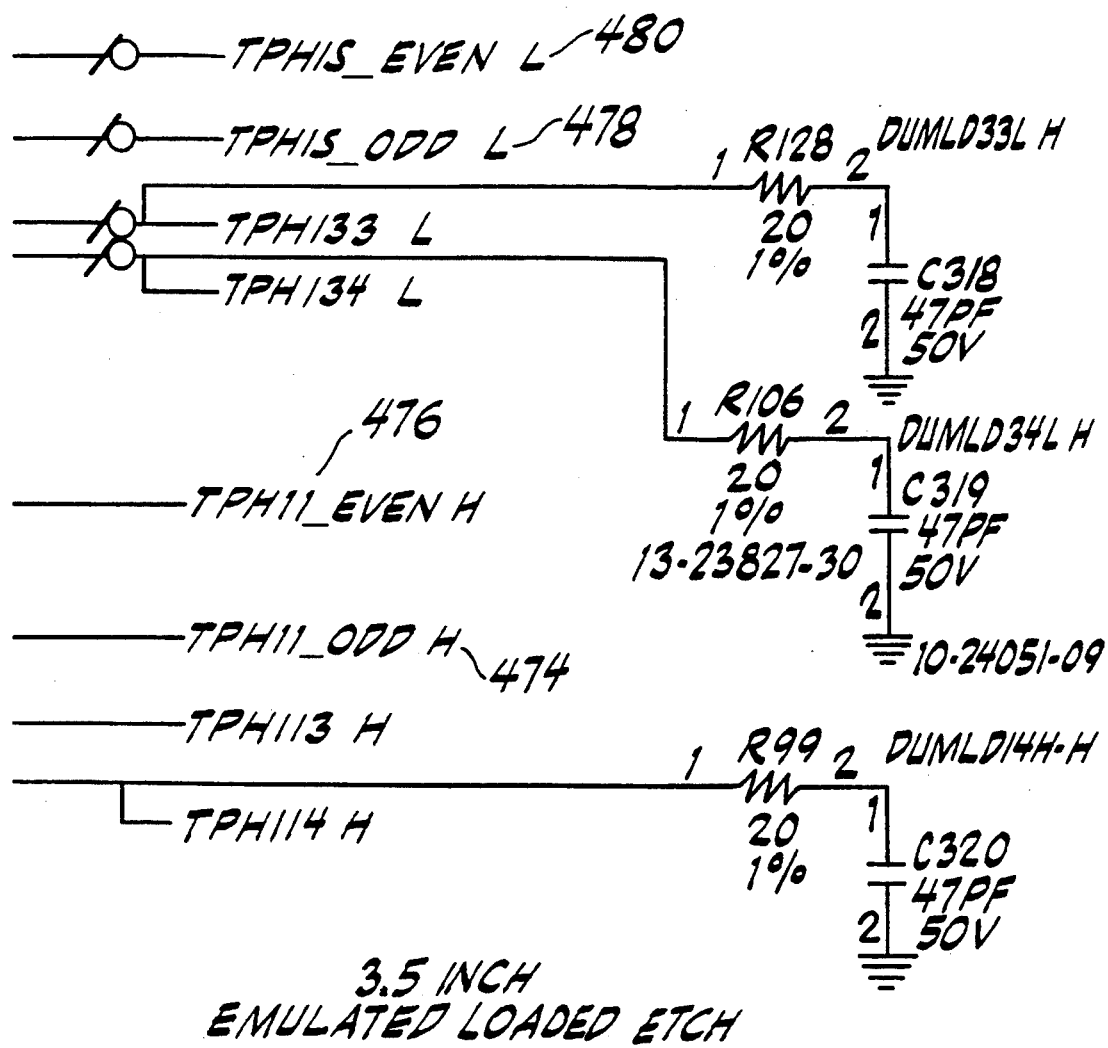
FIG. 6 is a key to reconstruction of FIGS. 6A–6G which is a circuit diagram of circuitry of a component coupled to the synchronous bus that receives the differential clocking signals.
Figure 6A:
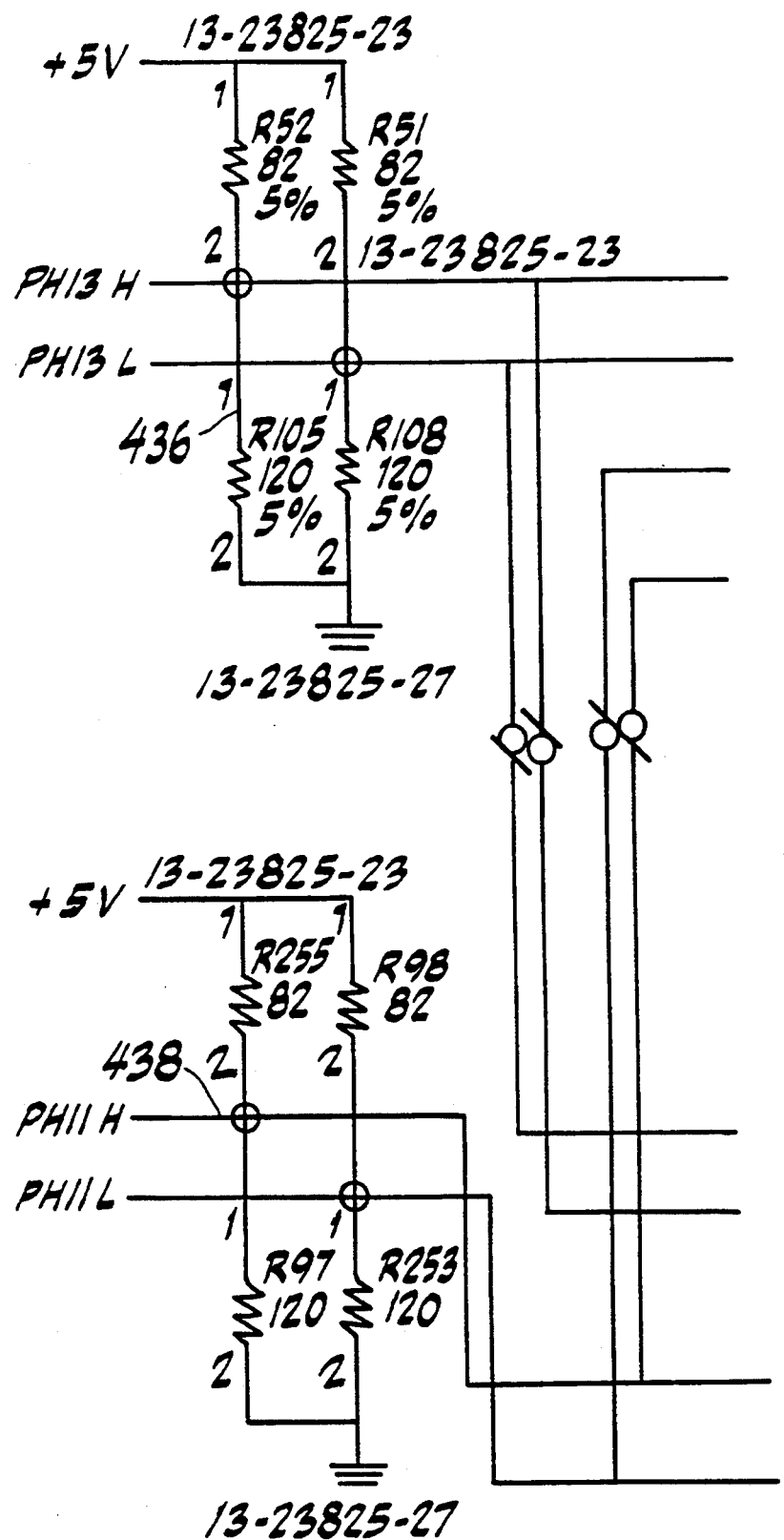
Figure 6B:
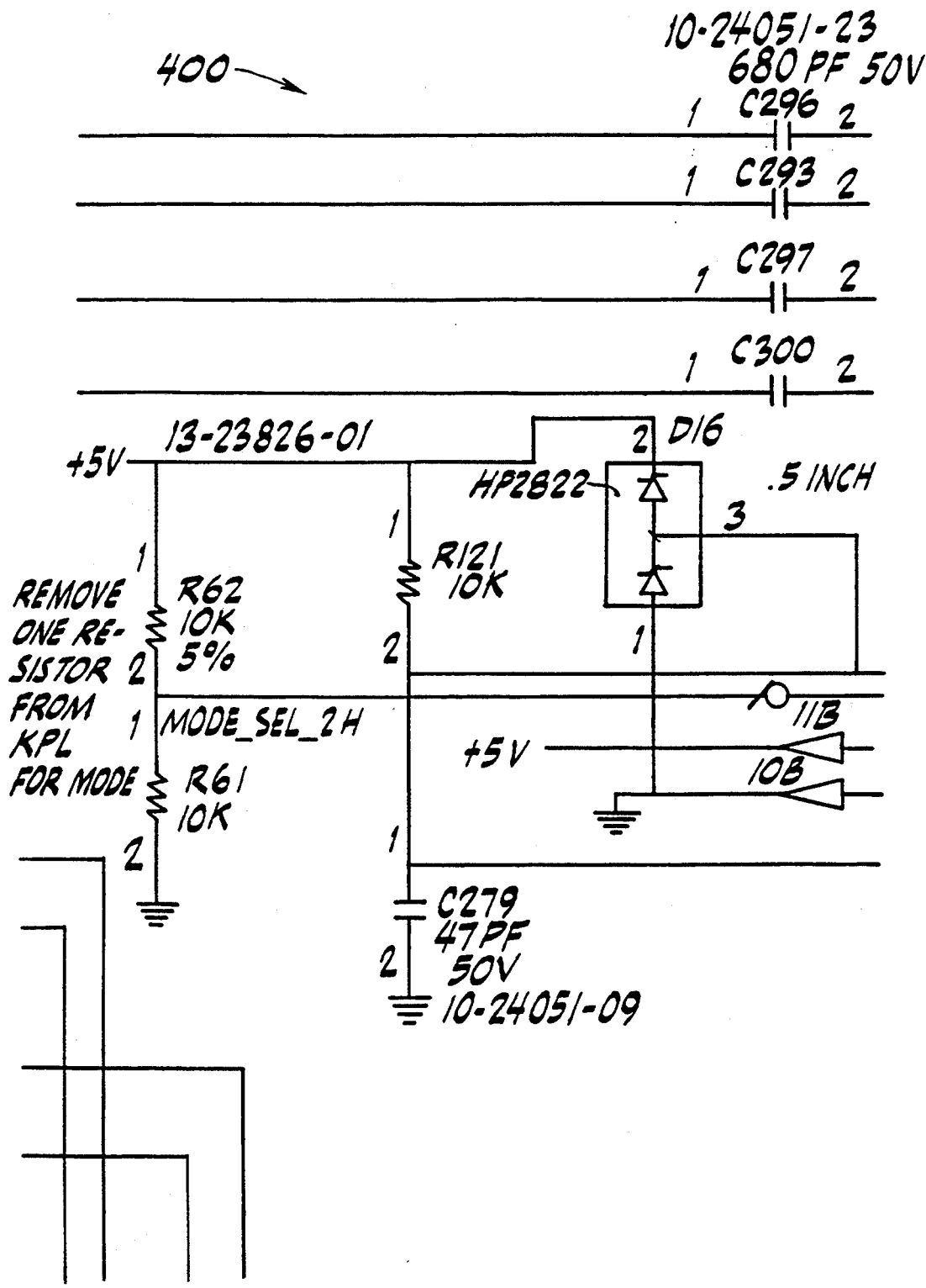
Figure 6C:
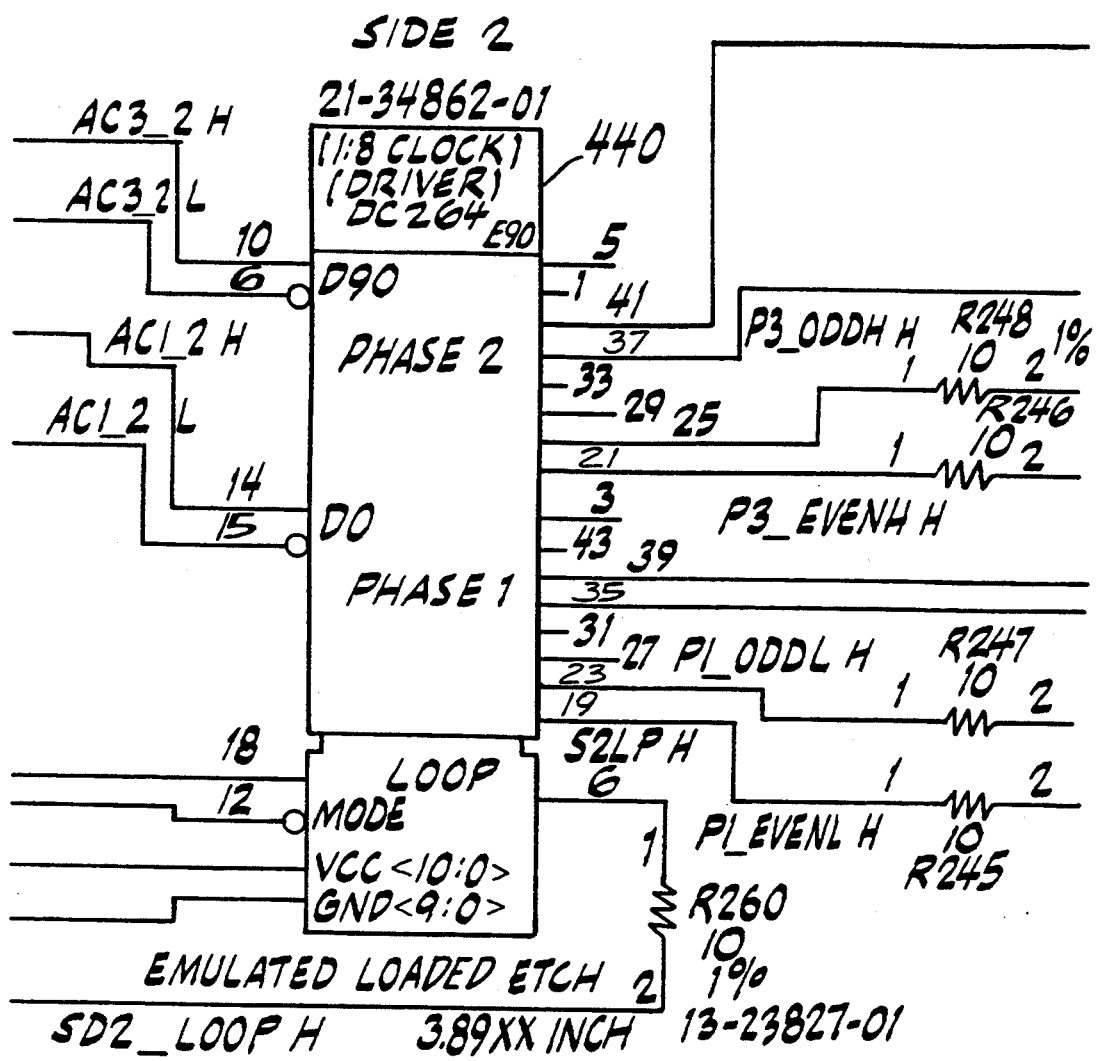
Figure 6D:
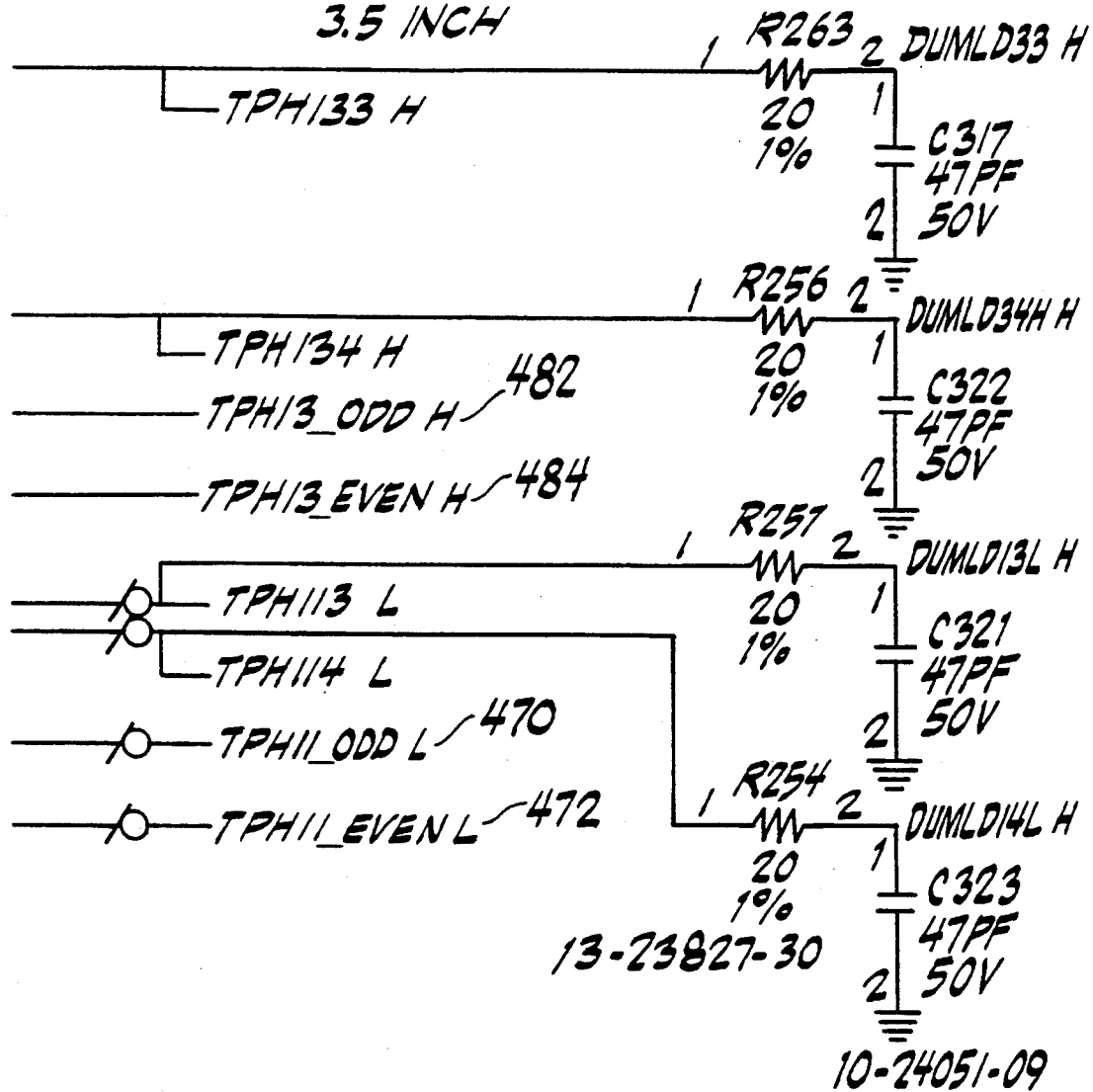
Figure 6E:
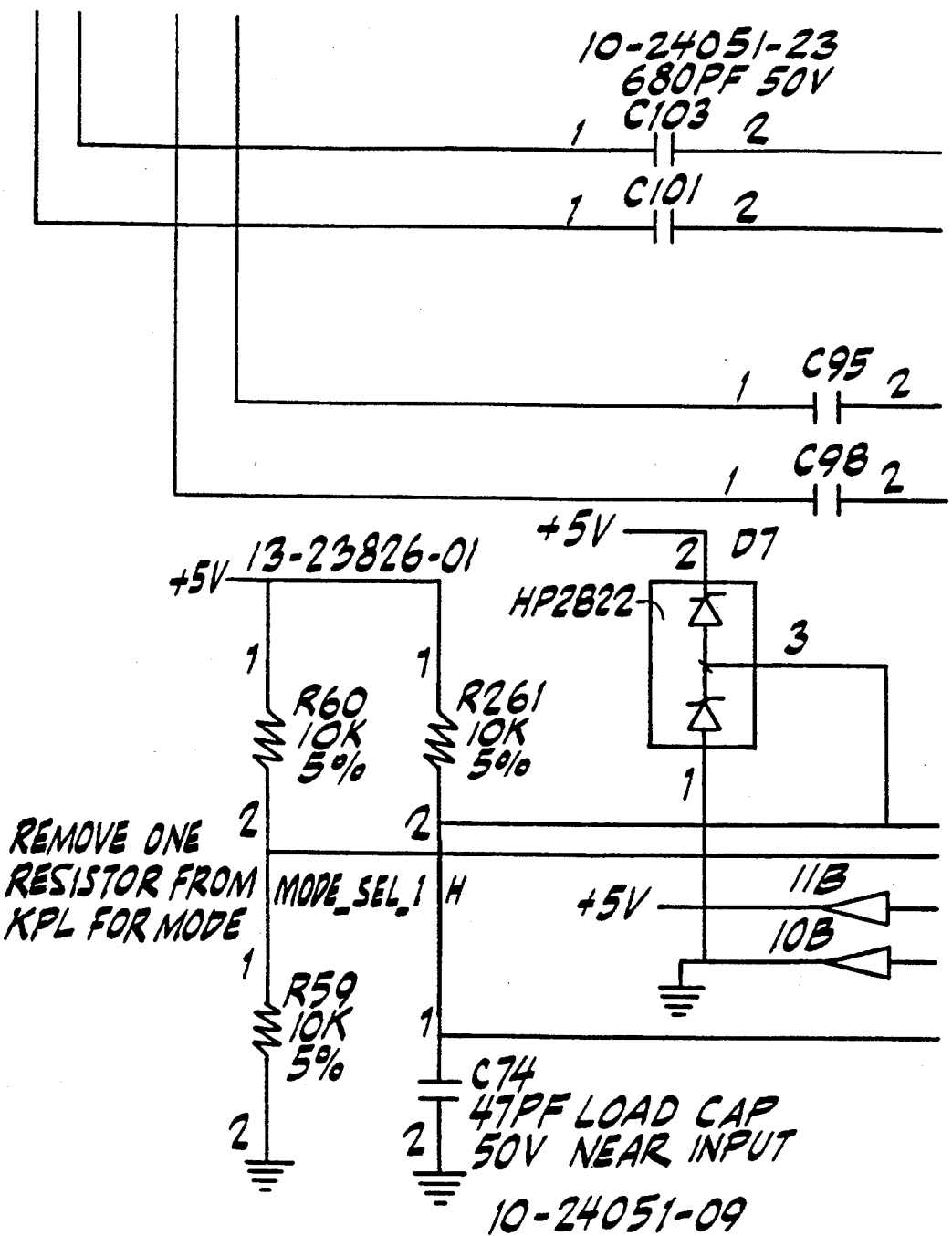
Figure 6F:
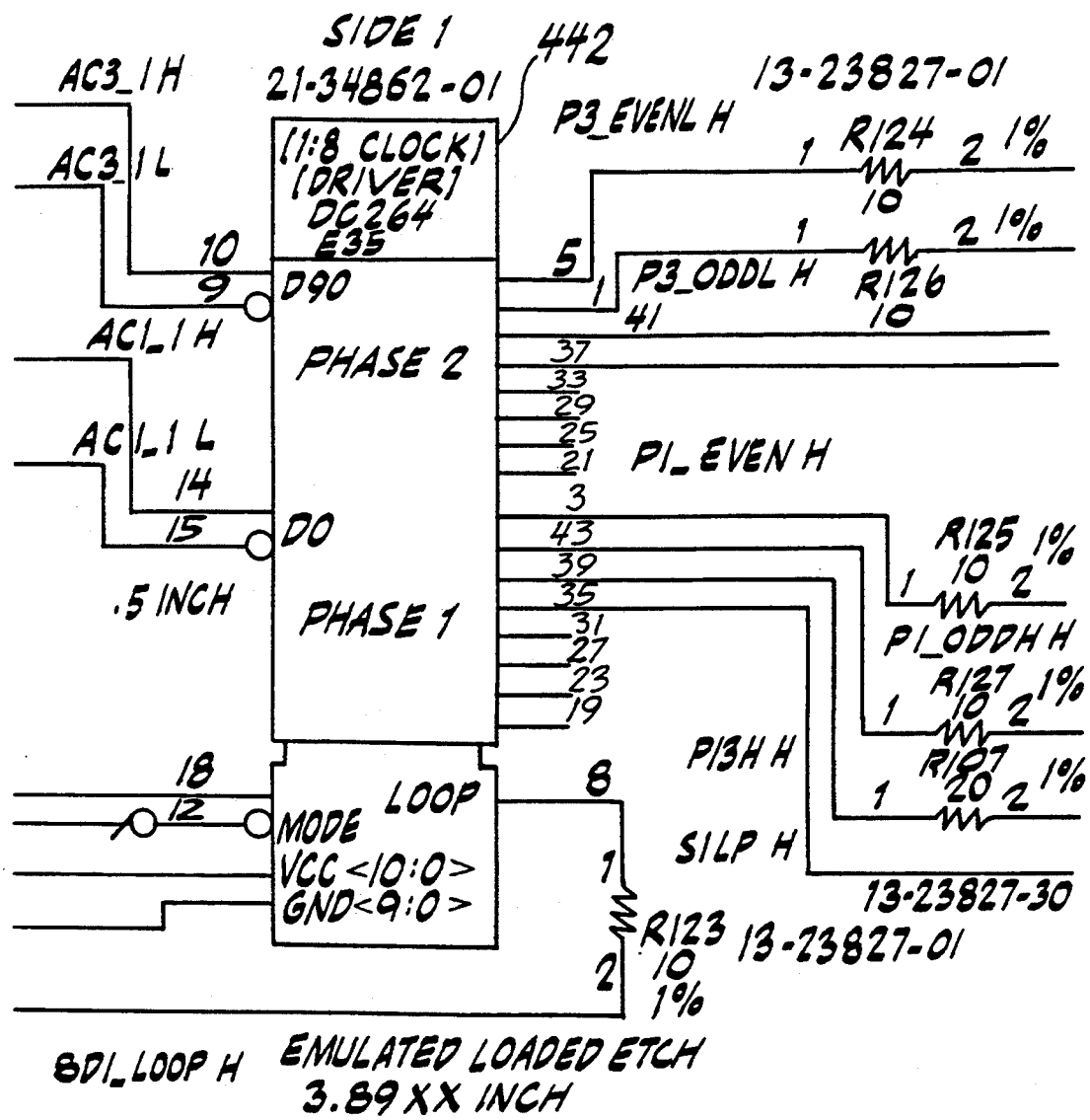

In FIG. 5, the metalization connections from radial clock driver backplane connector 122a to backplane connectors 110a, 112a, 114a, 116a, 117a, 118a, and 119a of CPU module 110, CPU module 112, IO module 114, and memory module 116, 117, 118, and 119 are shown. Again, all of the connection lines are of equal length and impedance to help minimize skew errors.

FIG. 6, generally at 400, shows a representative clock repeater circuit for a computing system component that receives the two pairs of differential clocking signals. The pair of differential clocking signals output from differential clock driver 234 are input to Thevenin terminator circuit 436. Similarly, the pair of differential clocking signals output from differential driver 232 are input to Thevenin termination circuit 438. Preferably, these are 50 Ω Thevenin terminator circuits to match the impedance of the connection lines.

The pair of clocking signals output from termination circuit 436 are A.C. coupled to PVTL compensation clock repeater chip 440, and the pair of clocking signals output from termination circuit 438 is A.C. coupled to PVTL clock repeater chip 442. Processing of the two pairs of differential clocking signals by PVTL compensation clock repeater chips 440 and 442 provides for tight skew regulation and signal level conversion from the PECL voltage level to a 5 volt CMOS level. This provides true and complementary single phase clock signals for distribution to computing system components. Clock repeater chips 440 and 442 are similar in structure and operation to those disclosed in U.S. patent application Ser. No. 08/049,019, filed on Apr. 16, 1993, titled "METHOD AND APPARATUS FOR CLOCK SKEW REDUCTION THROUGH ABSOLUTE DELAY REGULATION." The disclosure of this application is incorporated herein by reference. PVTL clock repeater chips 440 and 442 are configured to shape and convert the received clocking signals prior to generating copies of them. For example, clock repeater chips 440 and 442 convert the received differential clocking signals into 0 to 5 volt, 50% duty cycle digital pulse signals. The signals output from clock representative chips 440 and 442 are transmitted to other portions of the computing system component for final processing before being used for clocking purposes.

Figure 7:
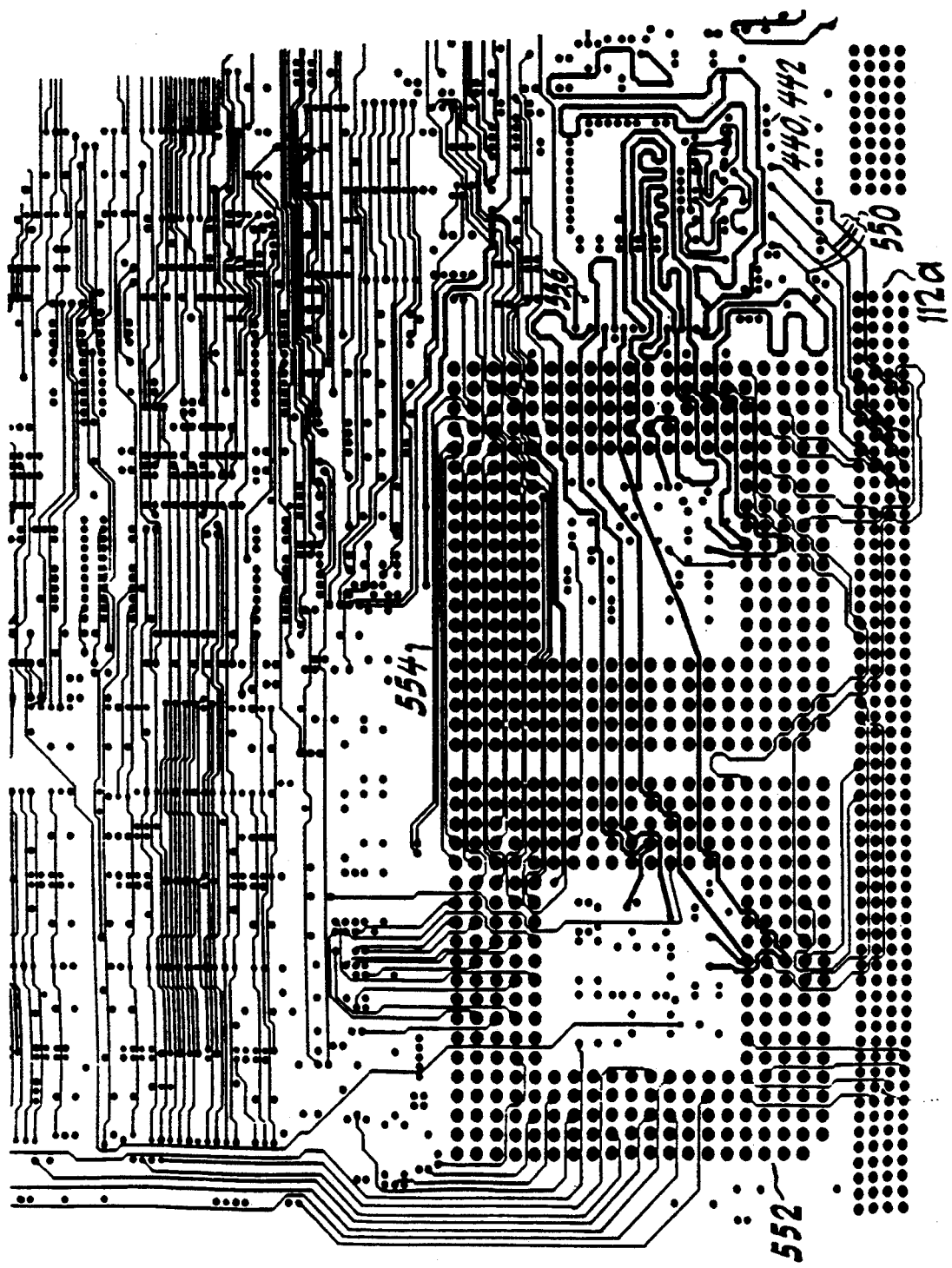
FIG. 7 is a etch diagram showing the metalization connection between the synchronous bus, and the clock repeater chips and gate arrays of a computing system component.

Referring to FIG. 7, representative metalization for connecting the differential clocking signals received at backplane connector 112a of CPU module 112 to clock repeater circuit 400 and then to gate arrays 552 and 554 is shown. Signal lines 550 that connect bus connector 112a to clock repeater circuit 400 are of equal length and impedance in order to help reduce skew errors.

Again, referring to FIG. 6, clock repeater chips 440 and 442 receive the signals output from the differential clock drivers 232 and 234 and generate eight clock signals. These are TPHI1_ODD L signal 470, TPHI1_EVEN L signal 472, TPHI1_ODD H signal 474, TPHI1_EVEN H signal 476, TPHI3_ODD L signal 478, TPHI3_EVEN L signal 480, TPHI3_ODD H signal 482, and TPHI3_EVEN H signal 484. TPHI1_ODD L signal 470, TPHI1_ODD H signal 474, TPHI3_ODD L signal 478, and TPHI3_ODD H signal 482 are input to CMOS gate array 552, and TPHI1_EVEN L signal 472, TPHI1_EVEN H signal 476, TPHI3_EVEN L signal 480, and TPHI3_EVEN H signal 484 are input to CMOS gate array 554. The signal lines 556 that couple clock repeater chips 440 and 442 and gate arrays 552 and 554 have equal lengths and impedances.

Figure 8A:
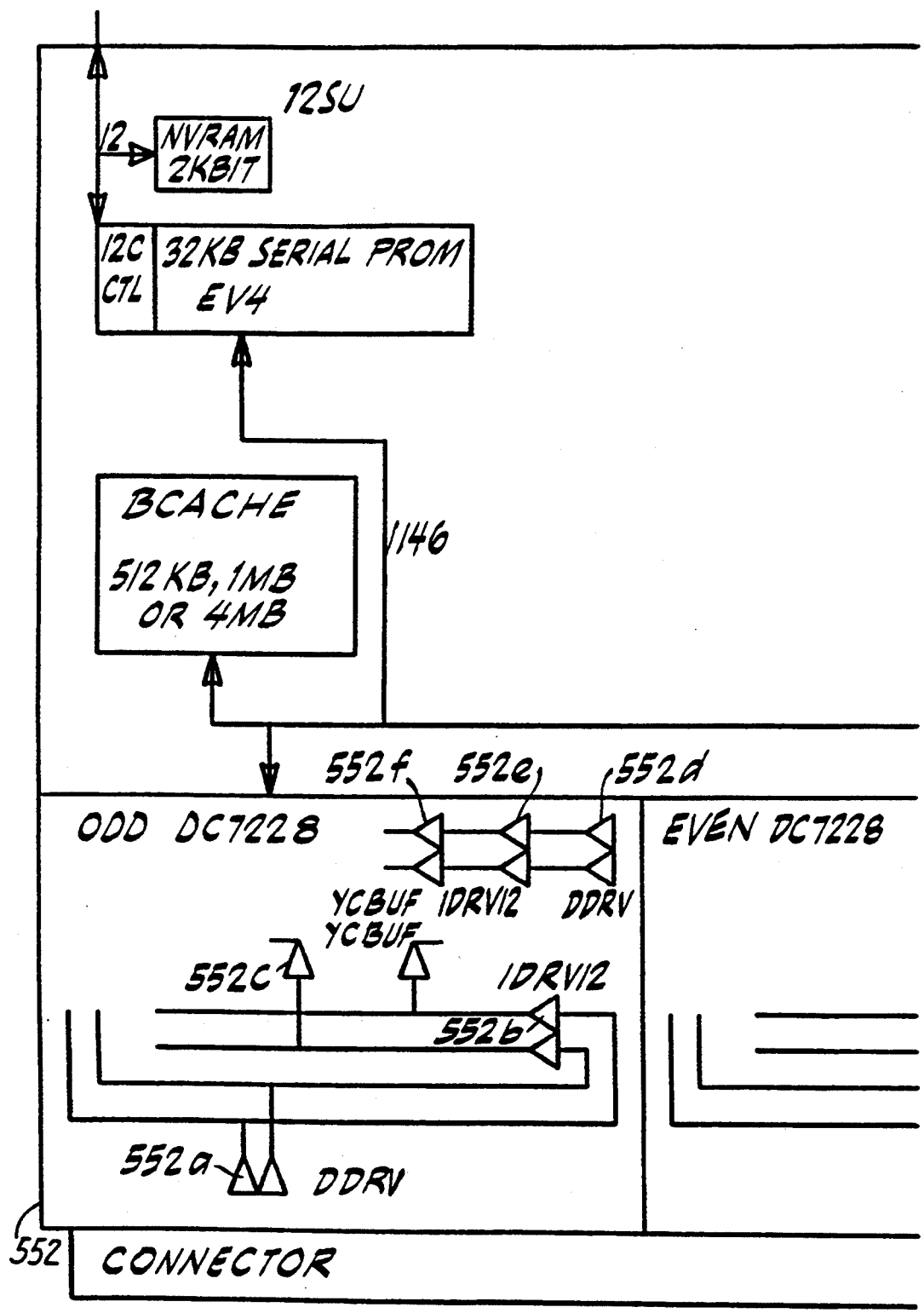
FIG. 8 is a block diagram of the gate arrays of the present invention.
Figure 8B:
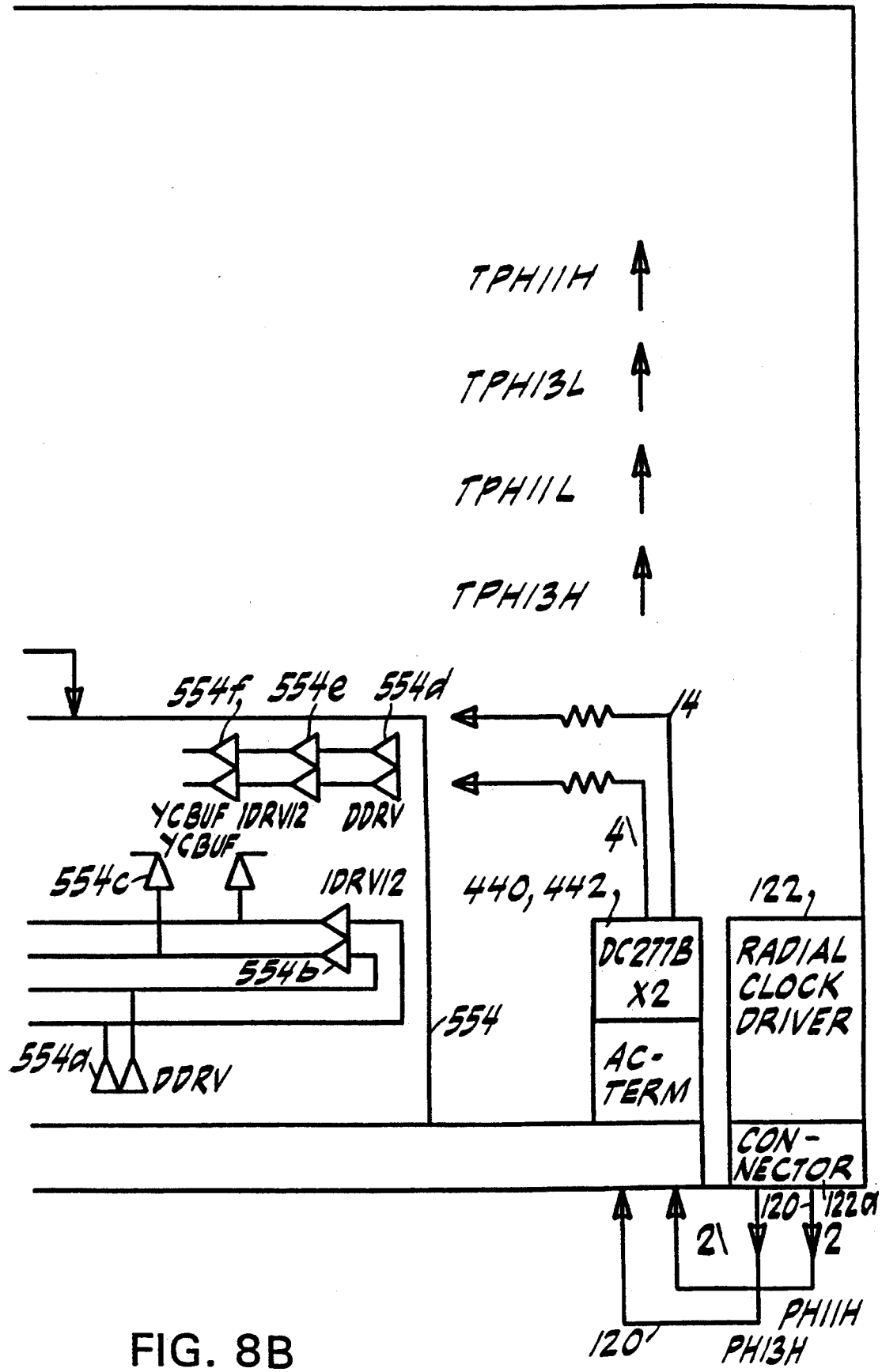

Referring to FIG. 8, portions of the CPU module 12 that receive the two differential pairs of clocking signals is shown. These portions are representative of the same portions that are part of each computing system component connected to the synchronous bus.

Gate array 552 includes direct drive circuitry 552a which receives TPHI1_ODD L signal 470 and TPHI1_ODD H signal 474 from clock repeater chips 440 and 442. The clocking signals that are output from direct drive circuitry 552a via low skew configured lines are input to internal driver circuitry 552b which changes the signal current (e.g., to 12 mAmps). The clocking signals are then supplied to local sub-buffer circuitry 552c via low skew configured lines and sub-buffer circuitry 552c distributes the signals to elements of CPU module 112. TPHI3_ODD L signal 478 and TPHI3_ODD H signal 478 are input to direct drive circuitry 552d in the first gate array 552. The output of direct drive circuitry 552d is input to internal driver circuitry 552e and then local sub-buffer circuitry 552f.

With regard to gate array 554, TPHI1_EVEN L signal 472 and TPHI1_EVEN H signal 476 are input to direct driver circuitry 554a. The output from direct driver circuitry 554a via low skew configured lines is input to interval driver circuitry 554b. The output from driver circuitry 554b view low skew configured lines is input to local sub-buffer circuitry 554c for distribution to component elements. TPHI3_EVEN L signal 480 and TPHI3_EVEN H signal 484 are input to direct driver circuitry 554d of second gate array 554. The output from direct driver circuitry 554d is input to interval driver circuitry 554e. The output of this circuitry is input to local sub-buffer circuitry 554f which then distributes the clocking signals to the component elements.

The synchronous bus transfers are carried out using edge-to-edge transfers over the two direct drive trunk lines which are part of each gate array. The direct driver circuitry is at the beginning of each trunk line and the internal driver circuitry is at the farthest delay point of each trunk line. The gate arrays are configured to ensure a known skew relationship between the clock signals input to, and those output from, the trunk lines.

Rather than immediately buffering the clocking signals in the gate arrays 552 and 554, the clocking signals are augmented by a main trunk driver and distributed over low skew configured lines to the local internal driver circuitry having weaker strength. Then the clocking signals are buffered by the local sub-buffer circuitry. This system for distributing the clocking signals helps to control skew across the circuitry of the gate array while avoiding loading the main trunk driver differently due to unique functions of each component connected to the synchronous bus. Furthermore, the 12 mAmp internal buffer current is used to minimize the process, voltage, and temperature variations, and, hence, skew between the gate arrays.

By using the system of the invention, the CMOS clock signals from clock repeater chips 440 and 442 are delivered directly to the CMOS gate arrays 552 and 554 to control bus interface circuitry. The signals are then buffered and delivered to other component elements. Component elements coupled to gate arrays 552 and 554 may combine these signals and operate at various speeds. The tight skew controls prevent set-up time and hold time problems when data or control information is transferred using edge-to-edge or edge-to-complementary edge type of transfers between any two or more component elements of the computing system.

The terms and expressions which are employed herein are used as terms of expression and not of limitation. And, there is no intention, in the use of such terms and expressions, of excluding the equivalents of the features shown, and described, or portions thereof, it being recognized that various modifications are possible within the scope of the invention.

What is claimed is:

1. A system for reducing clock skew in clocking signals that are radially distributed to computing system components that are coupled by a synchronous bus, comprising:
   a radial clock driver means generating a first pair of non-inverted and inverted clocking signals and a second pair of non-inverted and inverted clocking signals, with the second pair of clocking signals being delayed a predetermined time period with respect to the first pair of non-inverted and inverted clocking signals;
   a first set of equal length signal lines that connects the output of the radial clock driver means to each of the computing system components, with the first set of equal length signal lines carrying the first and second pairs of clocking signals; and
   at least one clock repeater chip at each computing system component, the clock repeater chip connecting to the first set of equal length signal lines, with the clock repeater chip being capable of receiving the first and second pairs of clocking signals from the radial clock driver means and converting the first and second pairs of clocking signals to clocking signals having a different format:
   first gate array means at each computing system component for processing and distributing the converted first and second pairs of clocking signals received from the clock repeater chip to elements of a component; and
   a second set of equal length signal lines at each computing system component coupling the clock repeater chip to the first gate array means, with the second set of equal length signal lines carrying the clocking signals having the different format.

2. The system as recited in claim 1, wherein the radial clock driver means includes a circuit that has first, second, and third flip-flops for generating the first and second pairs of clocking signals.

3. The system as recited in claim 2, wherein the first, second, and third flip-flops are clocked by a synchronous bus clock signal.

4. The system as recited in claim 3, wherein a non-inverting output of the second flip-flop is input to the data input of the first flip-flop, an inverting input of the second flip-flop is input to the data input of the third flip-flop, and the non-inverting and inverting outputs of the second flip-flop are the first pair of clocking signals and a non-inverting and an inverting output of the third flip-flops are the second pair clocking signals.

5. The system as recited in claim 4, wherein the period of the synchronous bus clock signal is one-fourth the clock period of first and second pairs of clocking signals.

6. The system as recited in claim 5, wherein the radial clock driver means further includes at least two differential clock drivers coupled between the outputs of the second and third flip-flops and the first set of equal length signal lines.

7. The system as recited in claim 6, wherein each component of the computing system further includes a Thevenin termination circuit means that connects between the first set of equal length signal lines and the clock repeater chip.

8. The system as recited in claim 1, wherein the first gate array further comprises,
- first direct drive circuitry capable of receiving and processing the converted first and second clocking signals from the clock repeater chip;
- first internal driver circuitry that is connected to the output of the first direct drive circuitry; and
- first local buffer that is connected to the output of the internal driver circuitry, the first local buffer being capable of distributing the converted first and second clocking signals to elements of a component.

9. The apparatus of claim 8, wherein the first gate array further comprises:
- second direct drive circuitry capable of receiving and processing the converted first and second clocking signals from the clock repeater chip;
- second internal driver circuitry that is connected to the output of the first direct drive circuitry; and
- second local buffer that is connected to the output of the internal driver circuitry, the second local buffer being capable of distributing the converted first and second clocking signals to elements of a component.

* * * * *